Oct. 18, 1949.  W. A. HOIER ET AL  2,484,887
CRANKSHAFT GRINDER
Filed May 16, 1946  20 Sheets-Sheet 2

INVENTORS
Walter A. Hoier
Edilio J. Rivoira
Lincoln E. Mehlhope
BY
H. K. Parsons & L. W. Wright.
ATTORNEYS INVENTORS
Walter A. Hoier
Edilio J. Rivoira
BY Lincoln E. Mehlhope
H. K. Parsons & L. W. Wright
ATTORNEYS

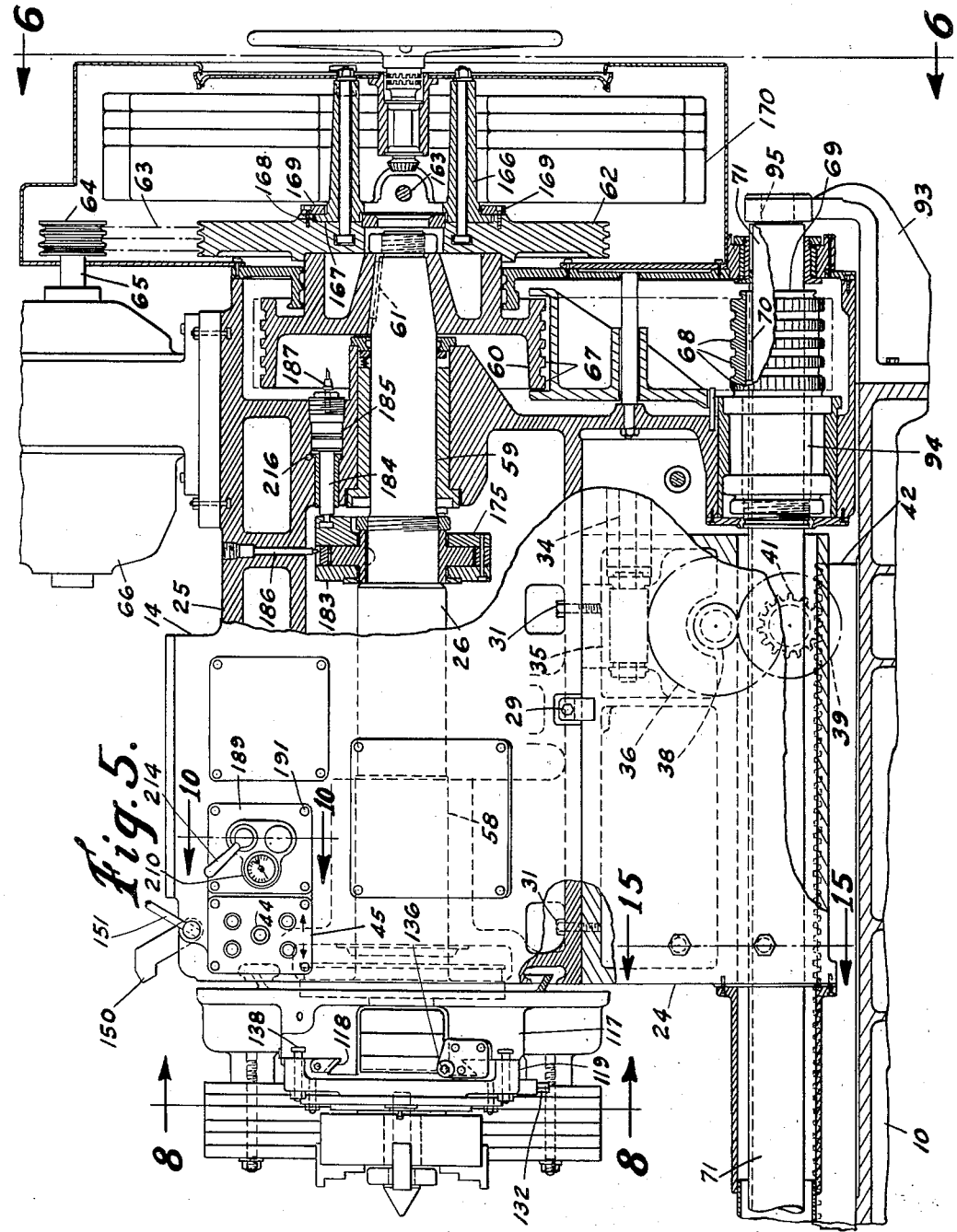

Oct. 18, 1949. W. A. HOIER ET AL 2,484,887
CRANKSHAFT GRINDER
Filed May 16, 1946 20 Sheets-Sheet 7

INVENTORS
Walter A. Hoier
Edilio J. Rivoira
BY Lincoln E. Mehlhope
H. K. Parsons + L. W. Wright.
ATTORNEYS INVENTORS
Walter A. Hoier
Edilio J. Rivoira
Lincoln E. Mehlhope
BY H. X. Parsons & L. W. Wright,
ATTORNEYS Oct. 18, 1949.  W. A. HOIER ET AL  2,484,887
CRANKSHAFT GRINDER
Filed May 16, 1946  20 Sheets-Sheet 9
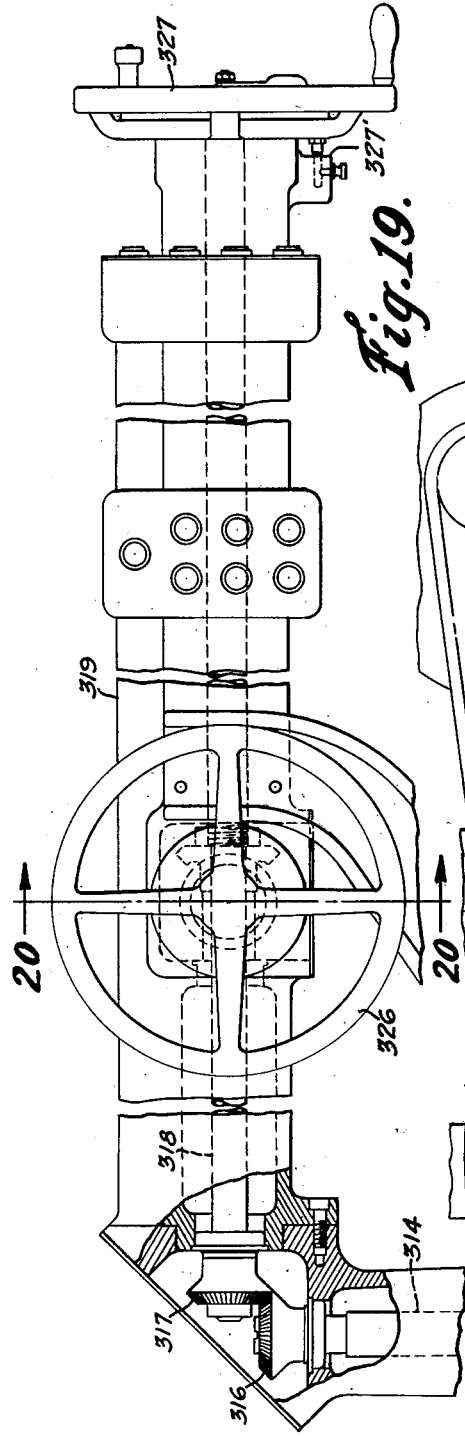
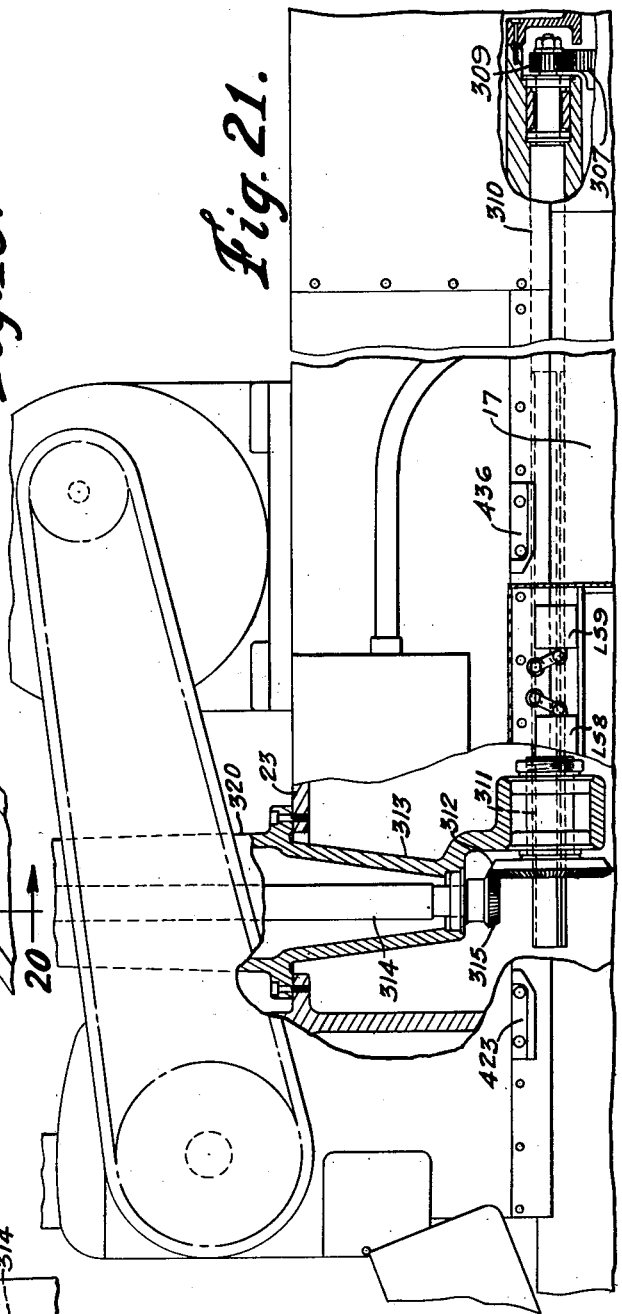
INVENTORS
Walter A. Hoier
Edilio J. Rivoira
BY  Lincoln E. Mealhope
H. K. Parsons + L. W. Wright.
ATTORNEYS

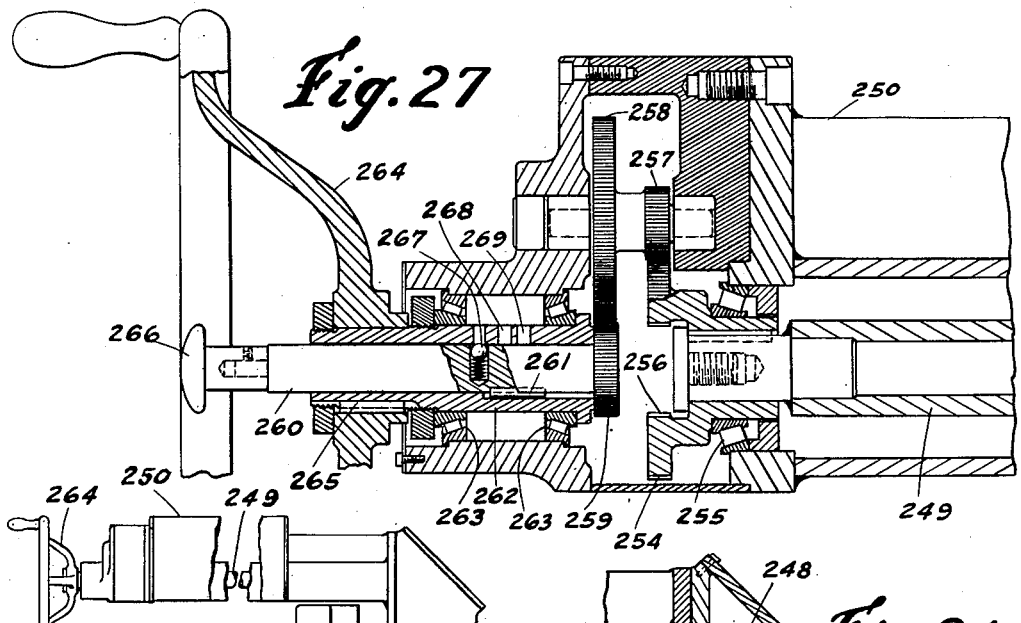
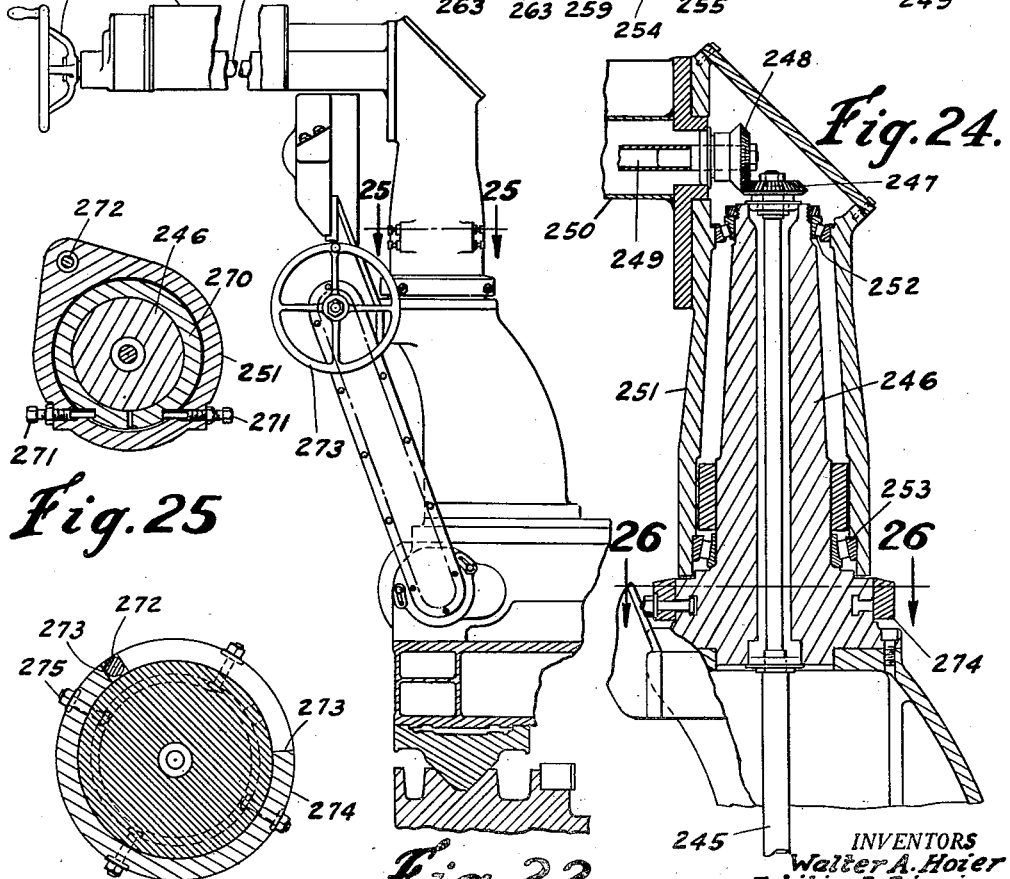
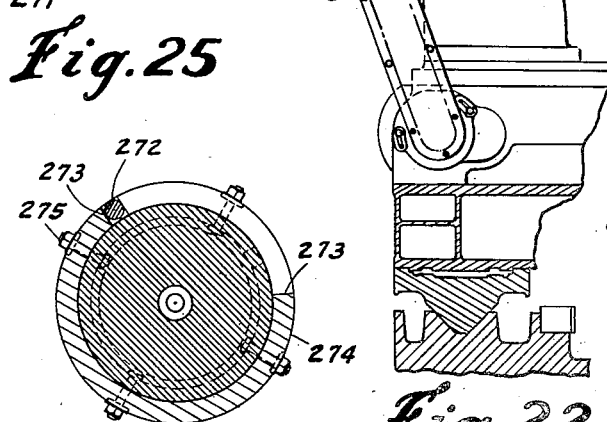

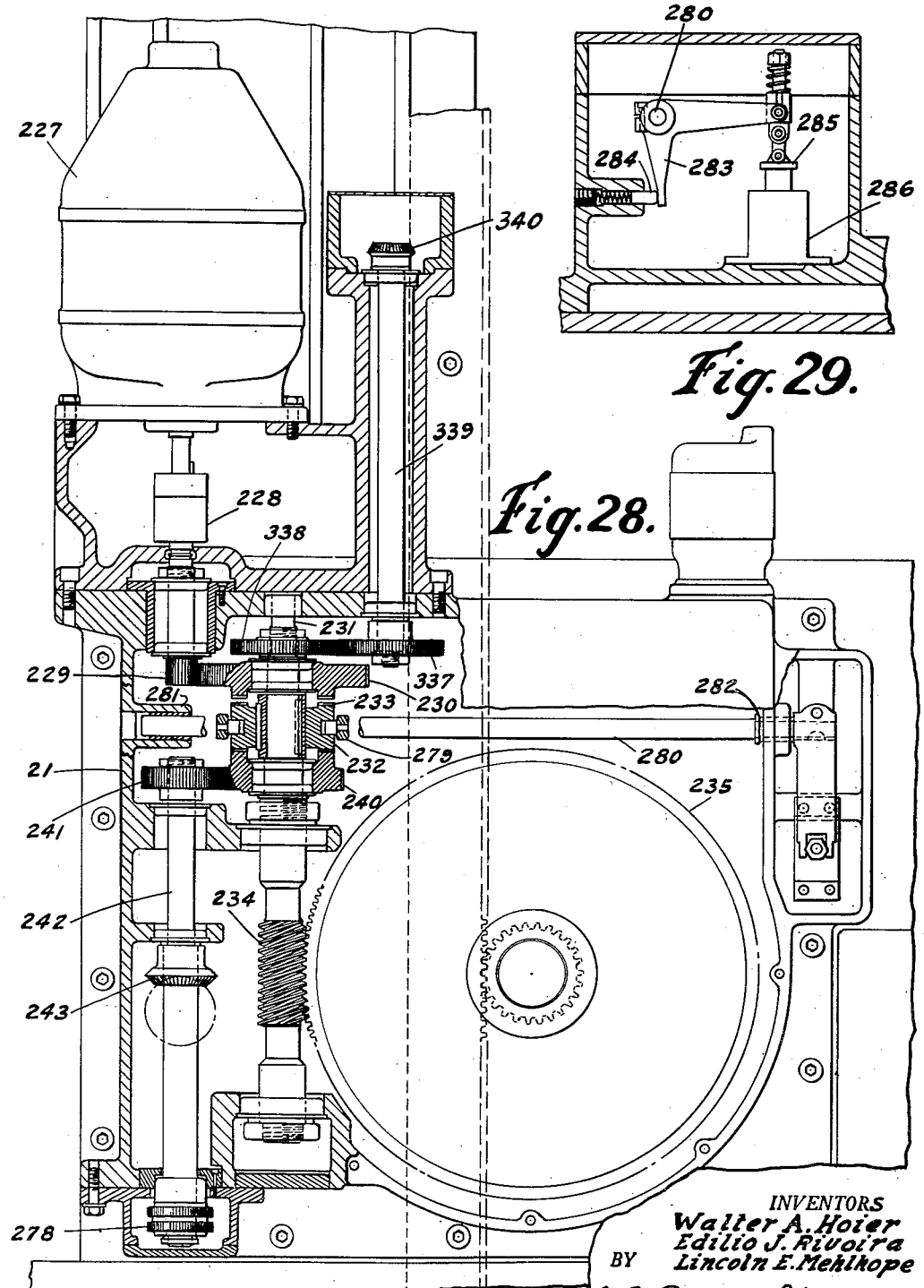

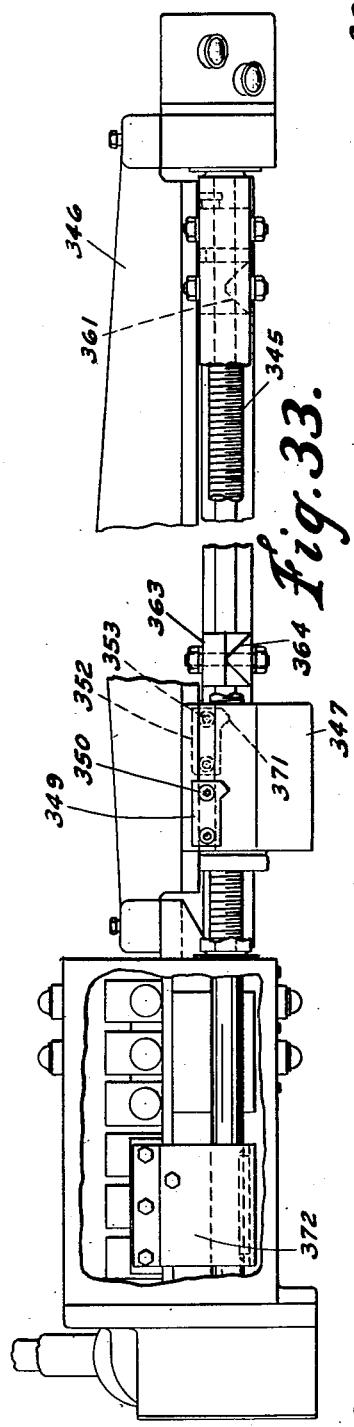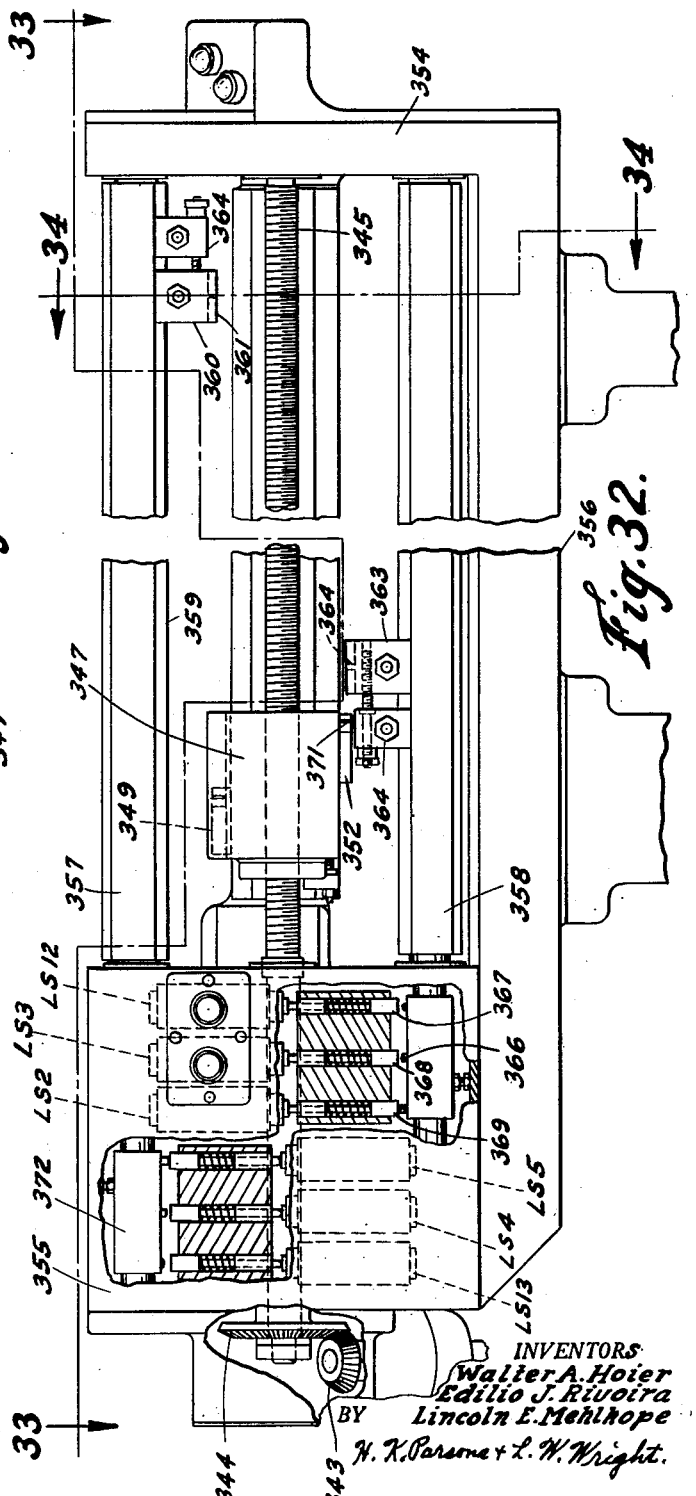

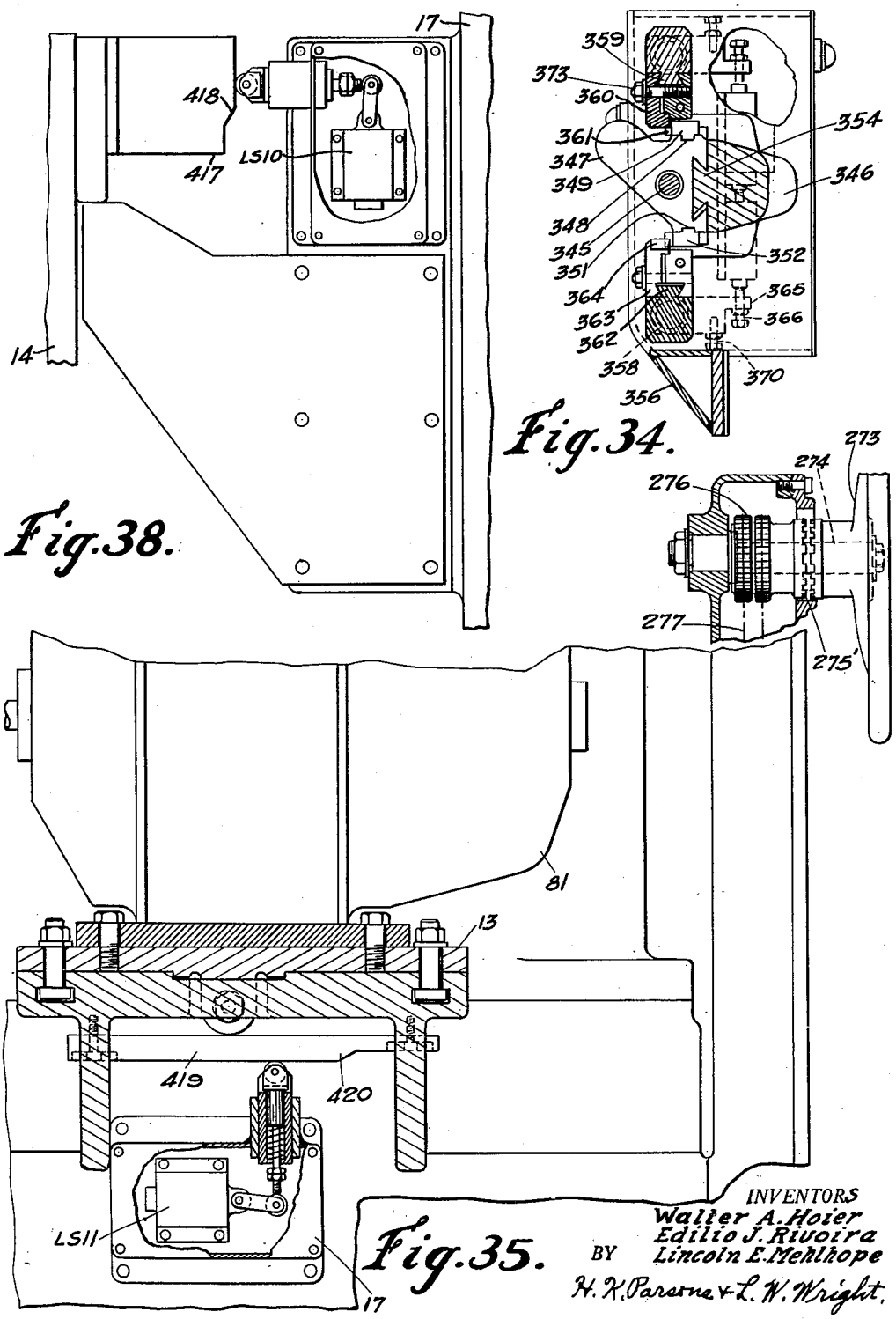

Oct. 18, 1949. W. A. HOIER ET AL 2,484,887
CRANKSHAFT GRINDER
Filed May 16, 1946 20 Sheets-Sheet 16

INVENTORS
Walter A. Hoier
Edilio J. Rivoira
Lincoln E. Mehlhope
BY
H. K. Parsons & L. W. Wright
ATTORNEYS

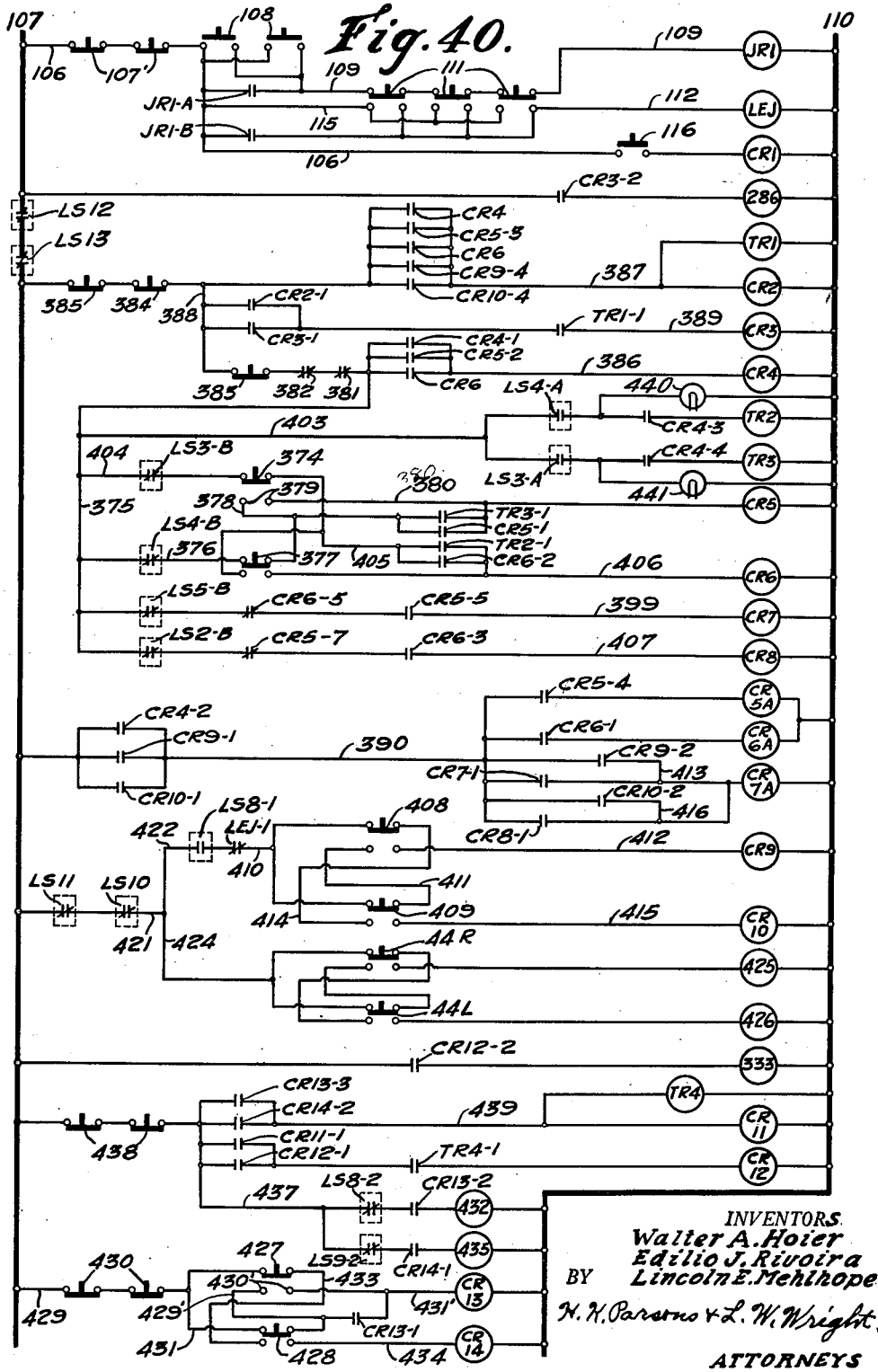

Patented Oct. 18, 1949

2,484,887

UNITED STATES PATENT OFFICE 2,484,887

CRANKSHAFT GRINDER

Walter A. Hoier, Cincinnati, Edilio J. Rivoira, Silverton, and Lincoln E. Mehlhope, Cincinnati, Ohio, assignors to The Cincinnati Milling Machine Co., Cincinnati, Ohio, a corporation of Ohio Application May 16, 1946, Serial No. 670,244

18 Claims. (Cl. 51—72)

This invention relates to machine tools and more particularly to improvements in grinding machines.

One of the objects of this invention is to provide an improved crankshaft grinding machine.

Another object of this invention is to provide a grinding machine of the character described with improved means for eccentrically supporting, adjusting, counterbalancing, and driving large heavy crankshafts which cannot be readily ground on present commercially available machines.

A further object of this invention is to provide an improved transmission and control mechanism for a grinding machine.

In a large machine of the character described it is difficult for the operator to readily observe all the moving parts at one time, and therefor it is an object of this invention to provide an improved control mechanism which automatically places certain restrictions on the manner of power operation to insure against collision of heavy moving parts and thereby improve the safety of operation of the machine.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 5 is an elevational view partly in section of the tailstock.

Figure 15 is a vertical section on the line 15—15 of Figure 5.

Figure 19 is a view, partly in section, of the dual manual control mechanism for the grinding wheel head as viewed on the line 19—19 of Figure 1.

Figure 21 is an elevational view of the grinding wheel slide, partly in section, showing part of the manual control mechanism therefor.

Figure 22 is an elevational view of the control mechanism for the traversing carriage as viewed on the line 22—22 of Figure 1.

Figure 24 is a sectional view of part of the column shown in Figure 22.

Figure 25 is a detail section in line 25—25 of Figure 22.

Figure 26 is a detail section on the line 26—26 of Figure 24.

Figure 27 is a sectional view of a portion of the cross feed mechanism shown in Figure 22.

Figure 28 is a horizontal section on the line 28—28 of Figure 23.

Figure 29 is a detail section on the line 29—29 of Figure 23.

Figure 32 is a sectional view of the trip control mechanism as viewed on the line 32—32 of Figure 30.

Figure 33 is a plan view of the trip control mechanism as viewed on the line 33—33 of Figure 32.

Figure 34 is a cross sectional view on the line 34—34 of Figure 32.

Figure 35 is a sectional view on the line 35—35 of Figure 30.

Figure 38 is a view looking upward at the underside of the traveling carriage showing the interlock with the footstock as viewed on the line 38—38 of Figure 3.

Figure 40 is a diagram of the general control circuit for the machine.

Figure 1:
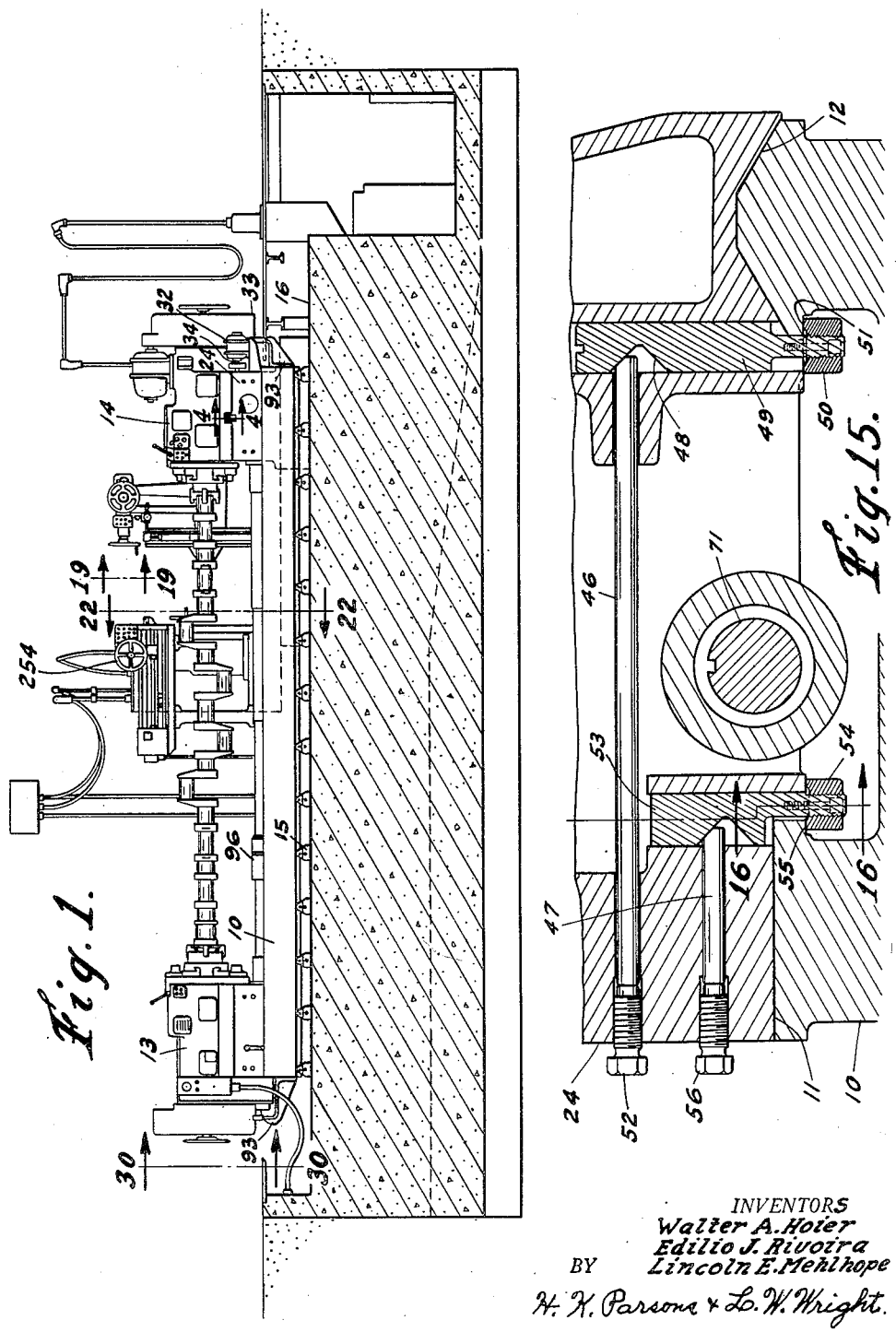
Figure 1 is a front elevation of a machine embodying the principles of this invention.
Figure 2:
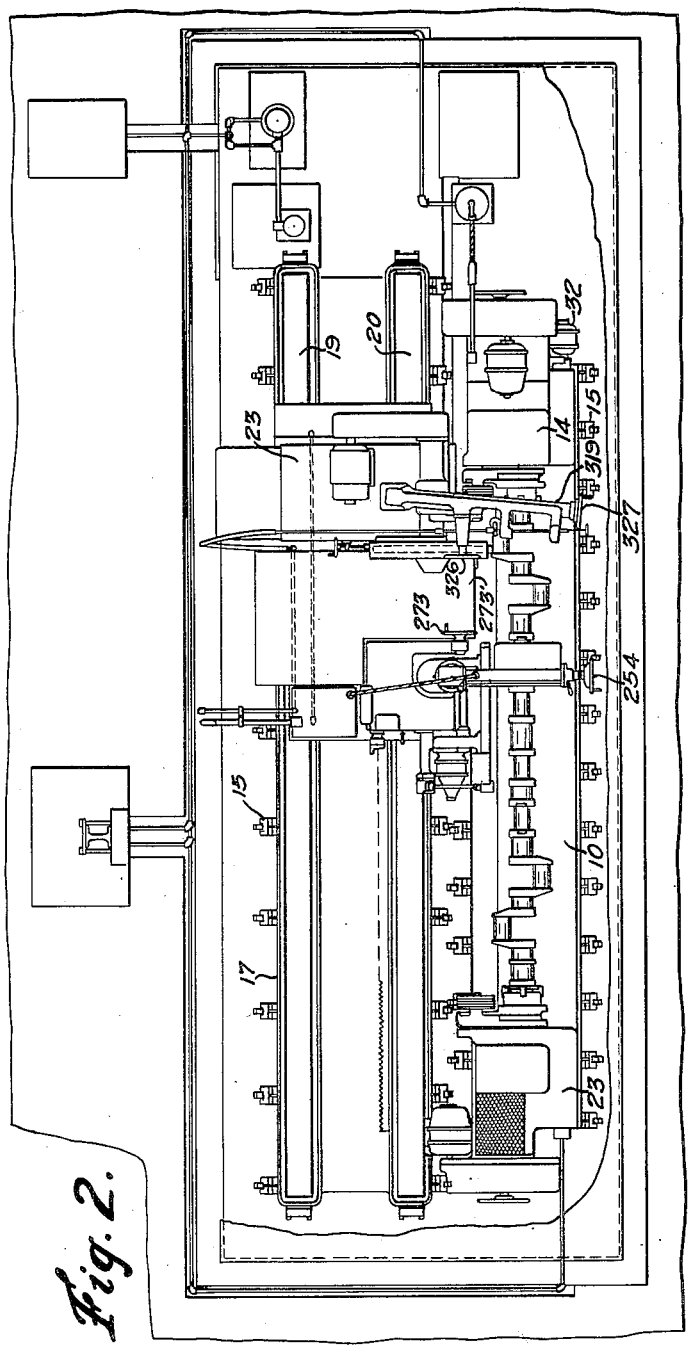
Figure 2 is a plan view of the machine shown in Figure 1.
Figure 3:
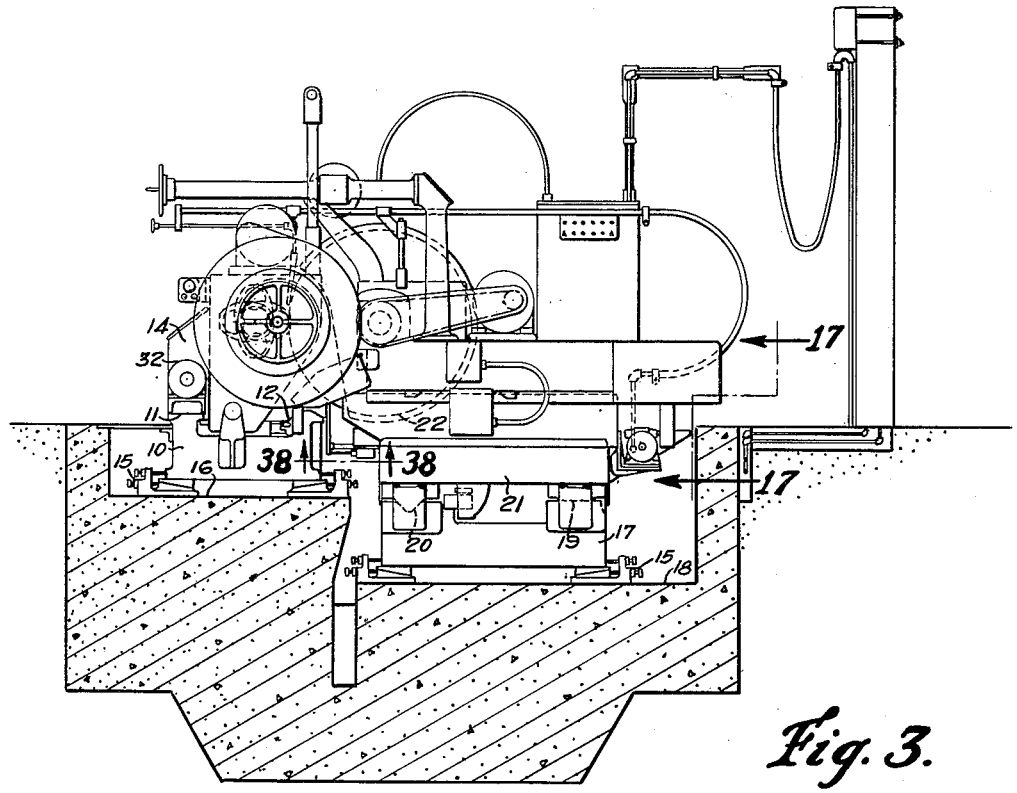
Figure 3 is an end view of the machine shown in Figure 1 as viewed from the right of that figure.

The general structure of the machine is shown in Figures 1, 2, and 3 and it will be noted more particularly from Figure 3 that the machine is preferably mounted on a specially shaped concrete foundation and that the machine comprises, in general, a longitudinally extending front bed member 10 which has guideways 11 and 12, which are shown more particularly in Figure 15, for supporting the headstock 13 and tailstock 14. Therefore, the front bed member serves as a separate means for supporting and guiding the head and tailstocks, and this member is suitably leveled and aligned by the wedge-adjusting units 15 which are suitably spaced along the concrete shelf 16 of the foundation. Extending parallel to the bed 10 is a second or rear bed member 17 similarly leveled and aligned by adjustable wedge units 15 mounted on the shelf 18 of the foundation. The bed member 17 provides the flat and V guideways 19 and 20 respectively for the horizontally traveling carriage 21 which supports a grinding wheel 22. The grinding wheel is rotatably supported on a cross slide 23 which is movable transversely of the traversing carriage 21.

It will thus be seen that the machine comprises in general a front bed member supporting head and tailstocks which, in turn, support a work piece for rotation; and a rear bed member having guideways which guide a traveling carriage for movement parallel to the axis of the work and this cariage, in turn, supports a cross slide carrying the grinding wheel which may be adjusted to feed the grinding wheel into the work.

Figure 4:
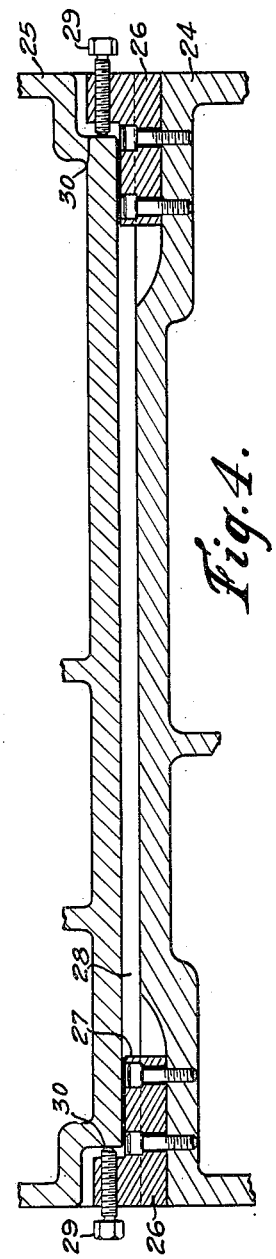
Figure 4 is a detail section on the line 4—4 of Figure 1 showing the manner of adjusting one of the stocks.

Referring to Figure 5, the tailstock member indicated generally by the reference numeral 14 comprises a subbase member 24 in which is formed the guide surfaces for cooperation with the guide surfaces 11 and 12 on the base 10 and on a spindle housing 25 mounted on top of the subbase 24. By making the spindle housing separate it makes it possible to align and adjust the spindle 26, which is journaled in the housing, relative to the headstock spindle for parallelism as well as correction of taper. This adjustment is effected by means shown in Figure 4 comprising a pair of keying blocks 26 which are attached to the subbase 24 having a key portion 27 which interfit a keyway 28 formed in the housing 25. Opposing set screws 29 are threaded in the blocks 26 engaging abutment surfaces 30 formed on the housing whereby the housing may be locked between the set screws, or adjusted by backing off one set screw and turning up or advancing the other set screw.

After such adjustments are made, the housing is additionally clamped to the subbase 24 by a series of clamping screws 31 which pass through the lower wall of the spindle housing and are threaded in the top wall of the subbase as shown in Figure 5. Normally the housing and the subbase constitute a single unit and this unit may be traversed or adjusted along the guideways 11 and 12 to accommodate the length of work to be processed in the machine.

Due to the great weight of the tailstock member, power operated means are provided for traversing the tailstock. This mechanism comprises an electric motor 32 which is mounted on a bracket 33 projecting from the rear of the subbase 24 as shown in Figure 1 of the drawings. The armature shaft 34 of the motor carries a worm 35, shown in Figure 6, which meshes with a worm gear 36 attached to a cross shaft 37. The shaft 37 is journaled in the subbase in suitable bearings and at one end carries a pinion 38 intermeshing with a spur gear 39. The gear 39 is mounted on a shaft 40 which is suitably journaled in the subbase and carries a pinion 41 which intermeshes with a rack bar 42 fastened to the main bed 10 by suitable means such as screws 43.

Operation of the motor 32 in one direction is controlled by a push button 44R, and in the other direction by push button 44L mounted on the control panel 45 which, as shown in Figure 5, is mounted on the side of the tailstock housing. These buttons control starters connected as shown in Figure 40 in such a manner that the push button must be held depressed to cause operation of the motor 32 and when the operator releases the button the motor stops.

Figure 16:
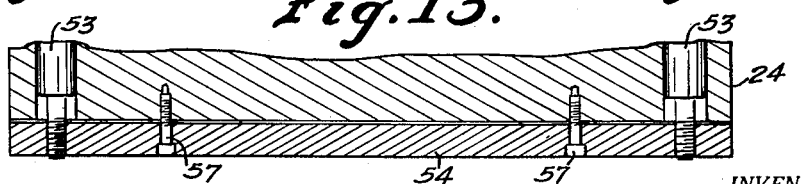
Figure 16 is a vertical section on the line 16—16 of Figure 15.

After any such adjustment the subbase 24 is clamped to the bed 10 by the means shown in Figure 15. On referring to this Figure it will be noted that there is a pair of bevel ended rods 47 and 46 which are supported in the subbase 24 for horizontal sliding movement. The bevel end of rod 46 engages one side of a V-shaped notch 48 formed in a vertical slidable clamping member 49 which has an adjustable clamping head 50 engaging a clamping surface 41 formed on the bed 10. By rotating a clamping screw 52 in the correct direction, the rod 46 is forced to the right as shown in Figure 15, thereby exerting an elevating pressure on the member 49 which forces the member 50 into clamping engagement with the surface 51. Similarly, the rod 47 engages a V-shaped notch in a second clamping member 53 which has a head 54 engaging a clamping surface 55 formed on the bed 10. By rotating a clamping screw 56 into engagement with the end of the rod 47, the members 53 and 54 are forced in such a direction as to exert a clamping pressure against the surface 55. By referring to Figure 16 it will be noted that the clamping member may be made coextensive in length with the subbase 24, and duplicate sets of clamping rods 53 secured to opposite ends of the member 54. Screws 57 may be threaded in the subbase 24 and having a loose fit with the member 54 to hold the member in place. It will be understood that the clamping member 50 is of similar construction.

Figure 39:
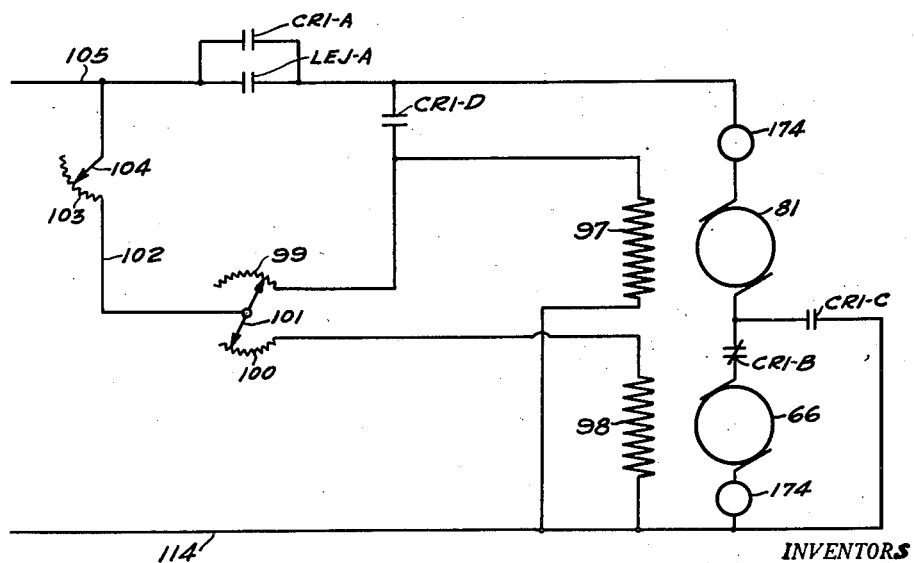
Figure 39 is a diagram of the electrical control circuit for the head and tailstock motors.
Figure 42:
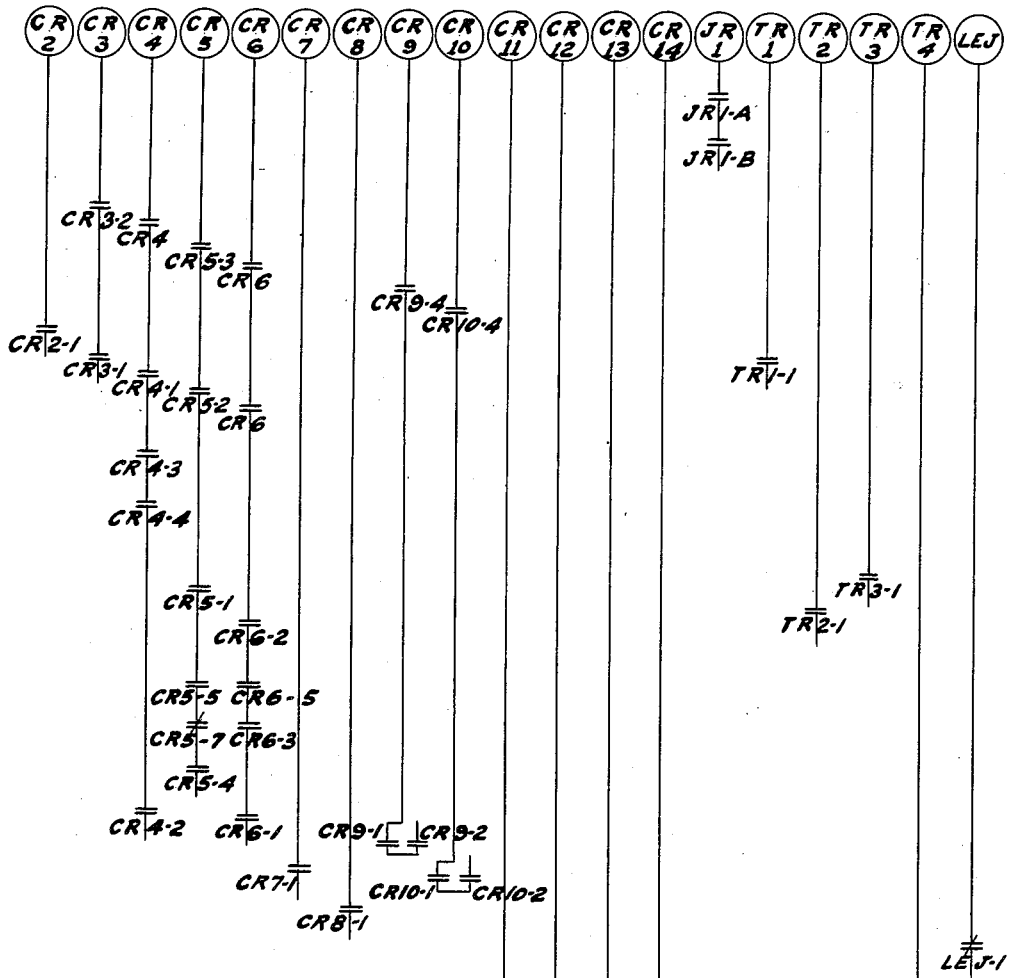
Figure 42 is a key chart showing the contacts operated by the respective relays shown in Figure 40 and so arranged that by placing this sheet alongside of the sheet containing Figure 40 the location of the contacts on Figure 40 may be ascertained.
Figure 43:
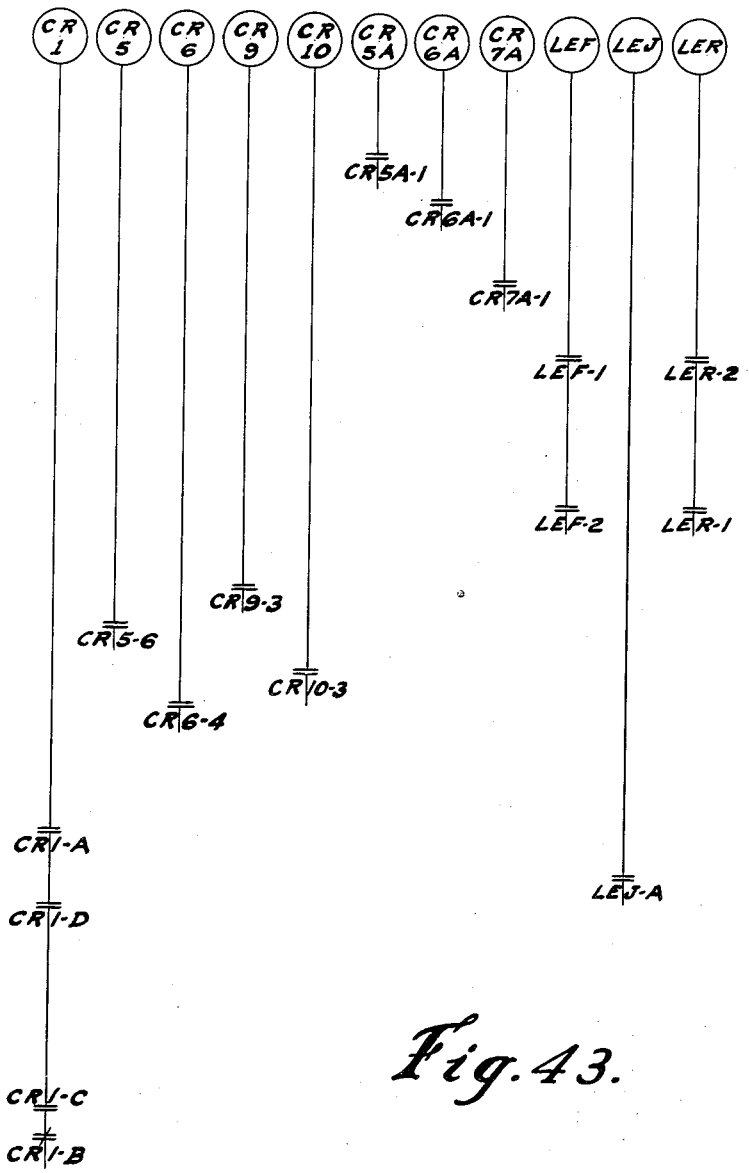
Figure 43 is a key chart for use with the sheet containing Figures 41 and 39.

The tailstock spindle 26 is suitably journaled in bearings 58 and 59 in the housing 25 and a suitable driving pulley 60 is attached to one end of the spindle adjacent the bearing 59. The pulley 60, which is keyed to the end of the spindle by a key 61, has integrally formed therewith a multiple grooved disc 62 which is connected by suitable driving mechanism, such as a plurality of V-belts or the like 63, to a multiple grooved motor pulley 64 attached to the end of armature shaft 65 of spindle motor 66. In addition to actuating the spindle, the pulley 60 is connected by a series of chains which engage sprocket teeth 67 formed on the pulley 60 and a second series of sprocket teeth 68 formed on a sprocket pinion 69 which is keyed at 70 to an interconnecting drive shaft 71. The drive shaft 71 extends longitudinally of the bed into driving engagement with the headstock and serves as a mechanical interconnection to insure synchronous rotation of the headstock and tailstock spindles, both of which are independently driven by their own motors but electrically connected for synchronous operation as shown in Figure 39.

Figure 6:
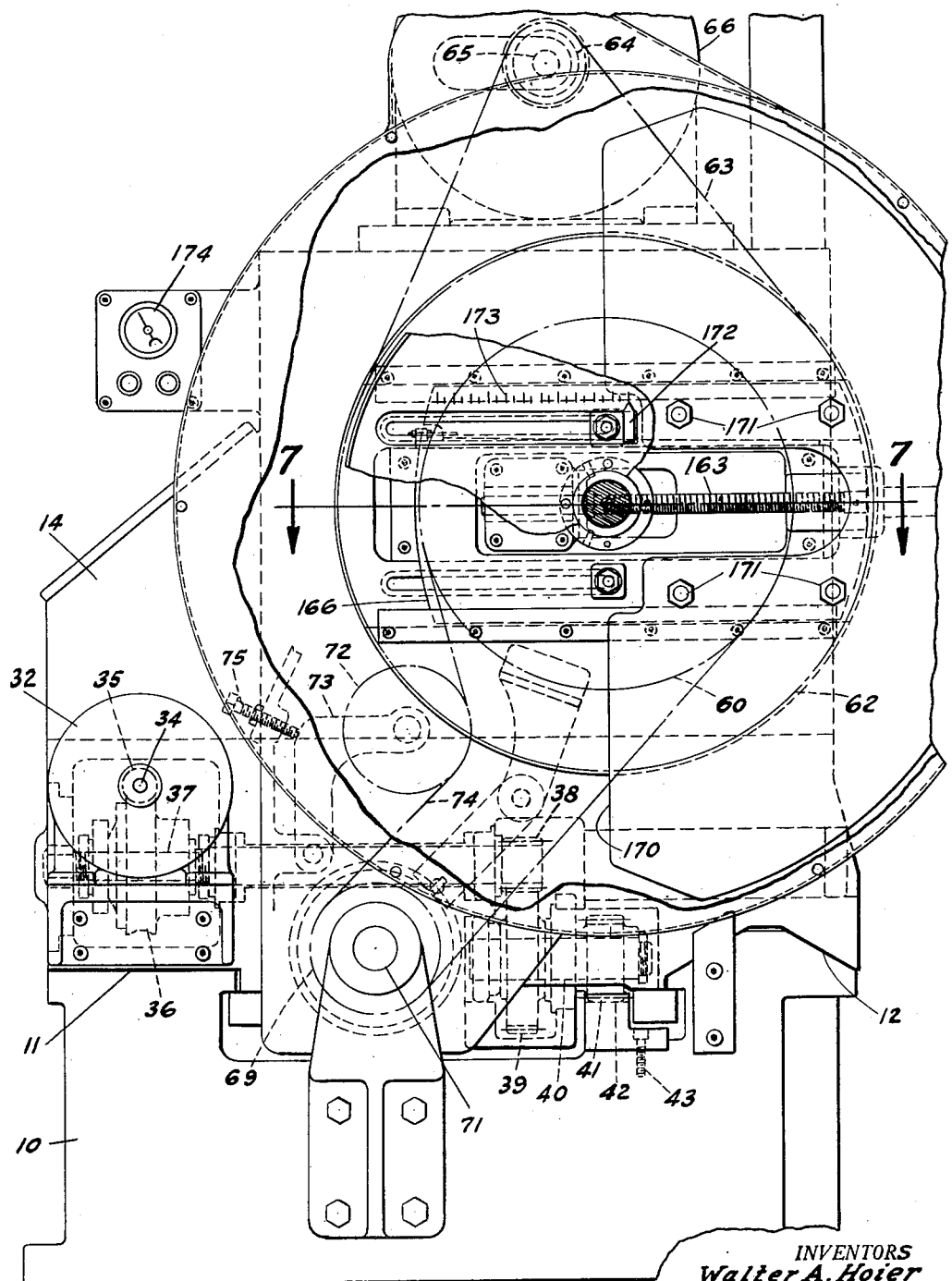
Figure 6 is an end view of the tailstock with parts partially broken away as viewed on the line 6—6 of Figure 5.

To take up slack in the chains, which slack is necessary for applying and removing the chains, an idler pulley 72, as shown in Figure 6, is supported on a pivotally adjusted arm 73 to engage the back of the driving chains which are indicated diagrammtically by the reference numeral 74. An adjusting screw 75 mounted in a fixed part of the machine serves to adjust the arm 73 and hold the pulley 72 in proper pressural engagement with the chain 74.

Figures 30, 31:
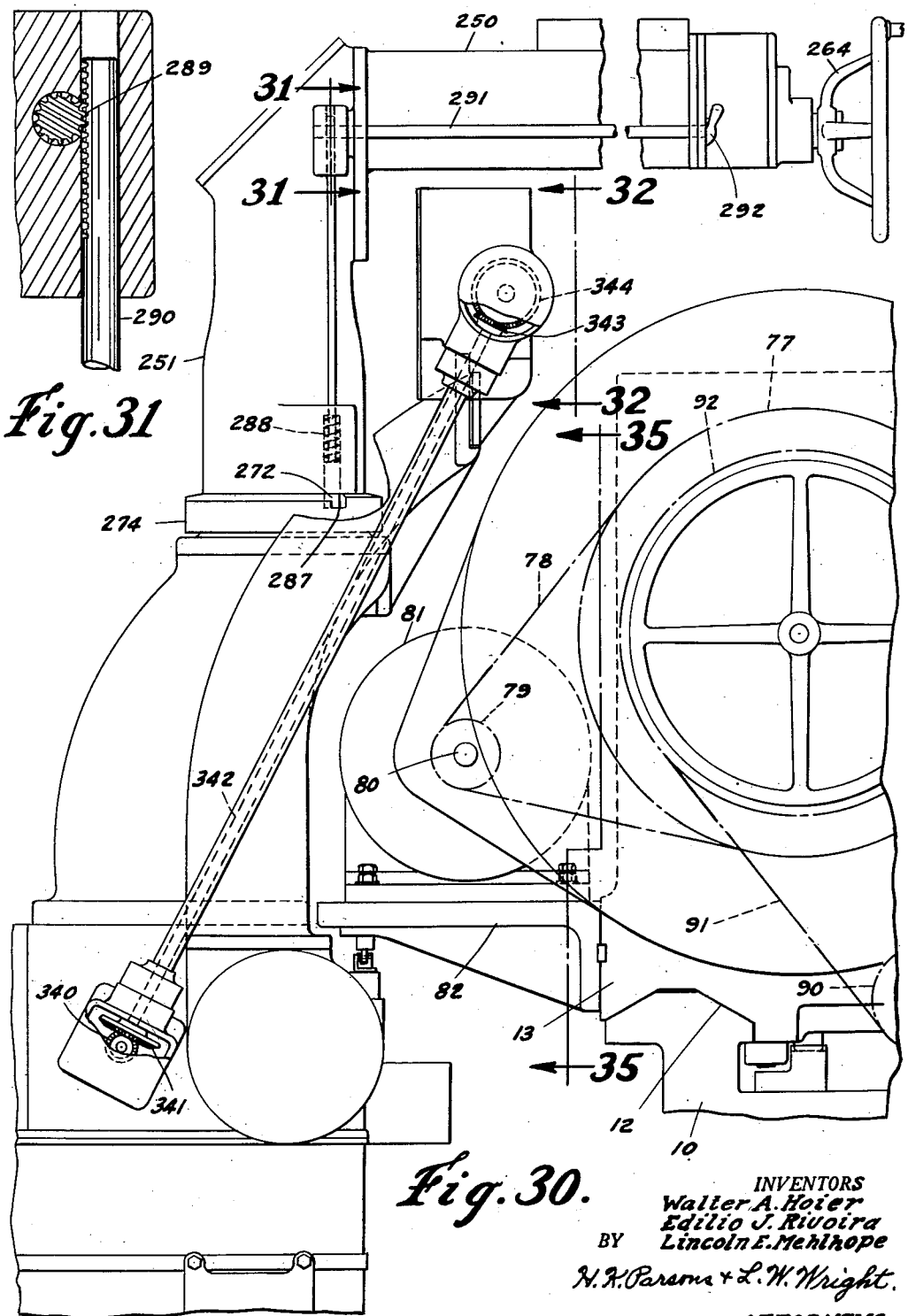
Figure 30 is an end elevation of the headstock as viewed on the line 30—30 of Figure 1.
Figure 31 is a detailed section on the line 31—31 of Figure 30.
Figure 36:
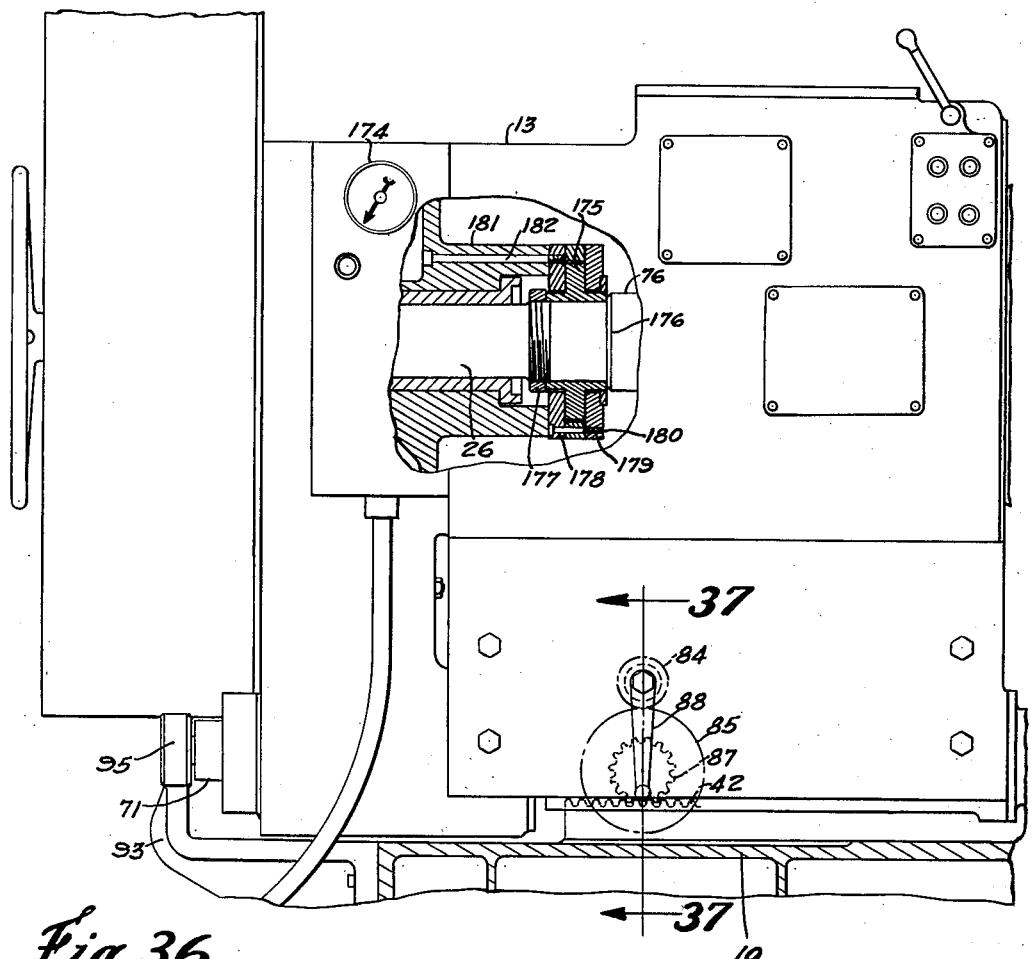
Figure 36 is a front elevational view of the headstock with parts in section.
Figure 37:
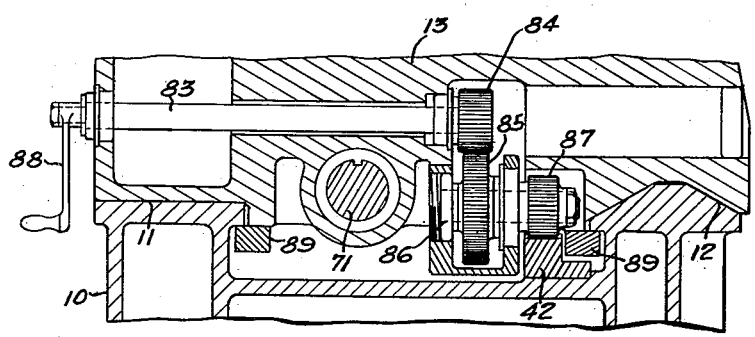
Figure 37 is a cross sectional view on the line 37—37 of Figure 36.

Referring now to Figures 36 and 37, the headstock, which is indicated generally by the reference numeral 13, has a spindle 76 journaled therein in a manner similar to the tailstock spindle, and is provided with a drive pulley 77, as shown in Figure 30, which is connected by multiple V-belts 78 to motor pulley 79 attached to the armature shaft 80 of drive motor 81. It will be noted that the motor 81 is mounted on a bracket 82 secured to the rear of the headstock spindle housing 13. This housing is supported upon the V and flat ways 12 and 11 respectively formed on the bed 10 for longitudinal adjustment with respect thereto.

Attention is invited to the fact that the stocks 13 and 14 have been designated for identification purposes as headstock and tailstock respectively, but these terms are not to be considered as terms of limitation because both stocks are adjustable on the bed and both stocks are provided with a source of power for driving their respective spindles and in that respect they are similar.

In this machine it is contemplated that minor adjustments for lengths of work will be accomplished by adjusting the tailstock member and therefore since it will be subject to adjustment more often than the headstock it is provided with power adjustment, but for major changes in work lengths the headstock is also provided with adjusting means, but these means are manually operable.

Such adjusting means are shown in Figure 37 and comprise a shaft 83 journaled in the base of the member 13 and provided with a pinion 84 intermeshing with a pinion 85. The pinion 85 is keyed to a shaft 86 which is journaled in a depending portion of the housing 13 and provided with a rack pinion 87 which interengages with the rack bar 42 which, as previously described, is secured to the bed 10. The shaft 83 is provided with a manually operable handle 88 which may be suitably secured to the end of the shaft 83 for imparting rotation thereto to effect traverse of the headstock. Suitable clamping bars 89 are also provided which are supported and operated in a manner similar to clamping bars 54 for the tailstock.

The interconnecting shaft 71 previously described extends through the headstock as shown in Figures 30 and 37 and is similarly provided with a sprocket chain pulley 90 which is connected by sprocket chains 91 to a sprocket chain pulley 92 secured to the headstock spindle 76.

From the foregoing it will be noted that the headstock and the tailstock are both adjustable relative to the bed 10 toward and from each other and to eliminate the necessity for utilizing telescoping shafts the interconnecting shaft 71 is made coextensive with the bed 10 and brackets 93 are attached to each end of the bed 10 as shown in Figure 1 for journaling opposite ends of the shaft 71.

This means that the shaft 71, as shown in Figure 5, has a sliding spline connection with the sprocket pulley 69 and also a sliding connection in the bearing 94 which supports the shaft adjacent the sprocket pulley 69, as well as a sliding spline connection with the sprocket 90 shown in Figure 30 which is journaled in the headstock. In other words, the shaft 71 has reduced bearing portions 95 on each end which are journaled in the brackets 93 so that the brackets 93 hold the shaft 71 against longitudinal movement.

The shaft 71, however, is made in two pieces, or in other words, is broken intermediate its length and these two pieces are connected together by flanged coupling members 96 as shown in Figure 1. The object of this is to provide means for effecting rotatable adjustment of one spindle with respect to the other under certain conditions of set-up and adjustment of the machine.

The electric motors 66 and 81 may be electrically coupled together for synchronous operation in the manner shown in Figure 6 of United States Letters Patent 1,952,423.

For convenience of reference, this figure is reproduced in Figure 39 of the drawings of the present application in which the reference numeral 97 indicates the field coil of motor 81 and the reference numeral 98 indicates the field coil of motor 66. These field coils are conected to the respective resistances 99 and 100 and an adjustable contact 101 connects these resistances in parallel to line 102 terminating in the speed control resistance 103. Adjustable arm 104 connects the resistance 103 to the positive power main 105. By adjusting the arm 101 the torque of the individual motors may be inversely adjusted for balancing the drive.

It is desirable, however, in the present machine to apply certain controls whereby the motors may be simultaneously operated at a continuous driving speed, simultaneously jogged for adjusting purposes, or the headstock motor may be individually jogged at a minimum speed while the tailstock motor remains stationary.

The control relays for accomplishing these results are shown in the electrical diagram in Figure 40, and in that figure it will be noted that there is a line 106 which is connected to the main power line 107. In the line 106 there is a plurality of stop buttons 107' which may be placed at spaced stations of the machine whereby the headstock motors may be stopped from different operating positions. Similarly, there is a pair of headstock start buttons 108 which are connected in parallel to line 106, and it will be apparent that by depressing either of these buttons a circuit connection is established to line 109. The line 109 has a plurality of jog buttons 111 connected in series therein and the line 109 extends to relay JRI, the other side of which is connected to power main 110. By operating one of the start buttons 108 the relay JRI is energized, and it closes latching switch JRI—A which short circuits the starting buttons 108. The relay JRI also carries a contact JRI—B which closes a circuit from line 106 through line 112 to relay LEJ. The relay LEJ carries a contact LEJ—A which, as shown in Figure 39, established the circuit from line 105 through motor armature 81, normally closed contact CRI—B and motor armature 66 to a negative line 114. This causes rotation of the motors 81 and 66 at whatever speed is determined by the rheostat adjuster 104. It should also be obvious that when the circuit 109 is open that one of the jog buttons 111 may be depressed to connect branch line 115 to line 112 to cause operation of relay LEJ and thereby jog the motors 81 and 66.

When it is desired to jog the headstock motor 81 without operating the motor 66 the flange coupling members 96 are disconnected and the jog button 116 is depressed which completes a circuit from line 106 through relay CRI to line 110. The relay CRI carries a first contact CRI—A as shown in Figure 39 which connects line 105 through motor armature 81. It also carries contact CRI—B which is normally closed but now is open to break the circuit to armature 66. However, an additional contact CRI—C is closed which completes a third circuit around the motor armature 66. It will thus be seen that the armature 81 will be actuated while the armature 66 remains stationary. In addition, it is desired that this motor be jogged at a basic low speed; therefore the relay CR—I carries an additional contact CRI—D which connects the line 105 directly to the field coil 97, by-passing the resistances 103 and 99 whereby the motor 81 will rotate at a basic slow speed.

Figure 8:
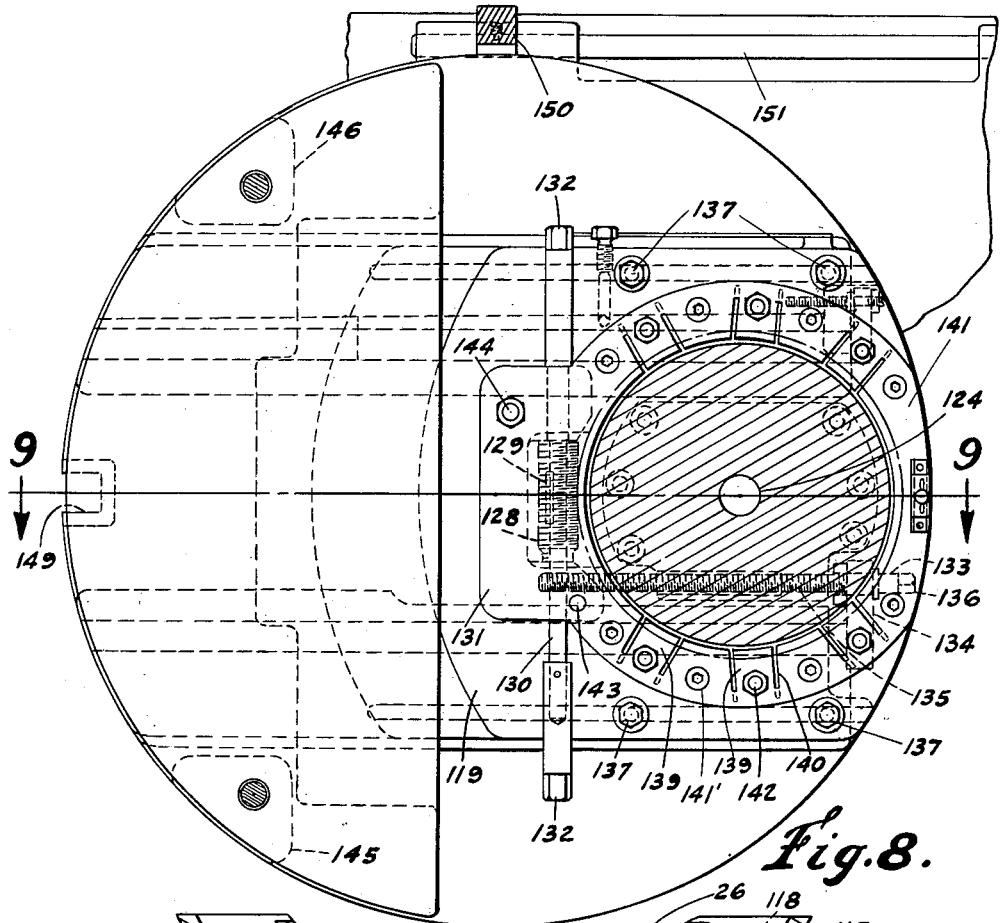
Figure 8 is a vertical section on the line 8—8 of Figure 5.
Figure 9:
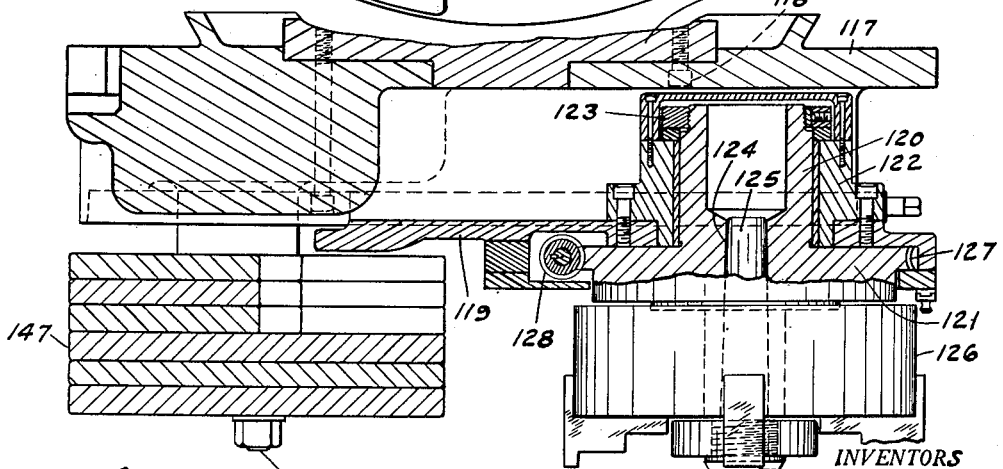
Figure 9 is a horizontal section on the line 9—9 of Figure 8.

Referring now to Figures 5, 8, and 9, the means will be described for supporting the crank shafts for eccentric adjustment whereby the individual cranks may be supported for rotation about their respective axes for grinding purposes. The mechanism in each stock is the same and therefore only the mechanism in the tailstock is shown and will be described. As shown in Figure 9 the tailstock spindle 26 has secured thereto the equivalent of a face plate 117 by suitable bolts 118. The face plate has a dovetailed guideway 118' formed therein upon which is slidably mounted a work chuck supporting housing 119. A spindle 120 is rotatably journaled in the housing and is formed with a flanged portion 121 on one end which forms a shoulder for engaging one end of the bearing member 122, and a collar 123 is threaded on the other end of the spindle for engagement with the other end of the bearing member whereby the spindle may be suitably adjusted to take up end play while still providing for satisfactory rotary adjustment. The spindle 120 has a conventional tapered hole 124 in which is mounted a conventional work supporting center 125. In addition to the center 125, the spindle is provided with a conventional multiple jaw work supporting chuck 126 which grips the work to impart rotation thereto. The flange portion 121 of the spindle has worm gear teeth 127 cut in its periphery for intermeshing with an adjusting worm 128 which is keyed at 129 to a shaft 130 that projects beyond opposite ends of the worm and is journaled in a bifurcated portion 131 of the face plate. Opposite ends of the shaft 130 are provided with nut portions 132 to which a suitable wrench may be applied for rotating the chuck for adjustment purposes. The chuck housing may also be radially adjusted in the cross guideway 118' by means of an adjusting screw 133 to suit the radius of the crank pin to be ground which is supported and held against longitudinal movement in a bracket 134 which is integral with the face plate 117. The screw is in threaded engagement with a nut portion 135 which is integral with the housing 119. Thus, by applying a wrench to the squared end 136 of the member 133 it may be rotated to effect the desired adjustment.

The housing 119 may be clamped in its cross adjusted position by four T bolts 137 which are mounted in T slots 138 formed in the face plate 117 as shown in Figure 5. The rotary spindle 120 may be clamped in adjusted position by means of resilient segments 139 formed by cutting radial slots 140 in a clamping plate 141 which is secured to the housing 119 by suitable screws 141' and which overlies the flange portion 121 of the spindle 120. Clamping bolts 142 pass through each of the resilient sections and by tightening the nuts threaded on the ends of these bolts the resilient sections may be forced into clamping engagement with the flange 121. The worm 128 is mounted in the member 131, and this member is pivotally supported on a pin 143 whereby it may be swung in a counterclockwise direction as viewed in Figure 8 to disengage the worm from the worm gear 127 to effect major adjustments and facilitate assembly but when swung into engagement with the gear a clamping bolt 144 serves to lock it in position.

Since the work chuck is eccentrically related with respect to the axis of the spindle 26 and creates an out-of-balance condition, means are provided for counterbalancing the weight of the chuck and this is accomplished by providing the face plate 117 with a pair of bosses 145 and 146 located on the opposite side of the center of the spindle with respect to the work chuck. These bosses serve as supports for a series of counterweights indicated generally by the reference numeral 147 in Figure 9 and are secured to the face plate by means of clamping bolts 148. It will be obvious that the number of plates utilized will depend upon various factors including the weight of the particular work piece being worked upon. These weights, however, are auxiliary to the main counterbalancing mechanism to be described.

When the machine is being set up for a given work piece, it is desirable for various reasons that the cross adjustment screw 133 lie in a vertical plane and therefore to insure that the face plates of both stocks are in a corresponding position each face plate is provided with a locating notch 149 cut in the periphery thereof and this notch is adapted to cooperate with a locating lug 150 which is secured to a rod 151. This rod projects to the front of the machine or stock where it is provided with an operating handle 151 as more particularly shown in Figure 5. By means of this handle the lug may be rotated into engagement with the locating notch and thereby both face plates will be located in the same relation while the work is being eccentrically adjusted to position a given crank pin in proper eccentric relation. After the first crank pin has been ground, the adjusting worm 129 is rotated to index the crank shaft and thereby locate the next crank pin on the center of the head and tailstock spindles. It will be obvious that the handle 151 is rotated in a clockwise direction as viewed in Figure 5 to effect retraction of the member 150 during operation of the machine.

Figure 7:
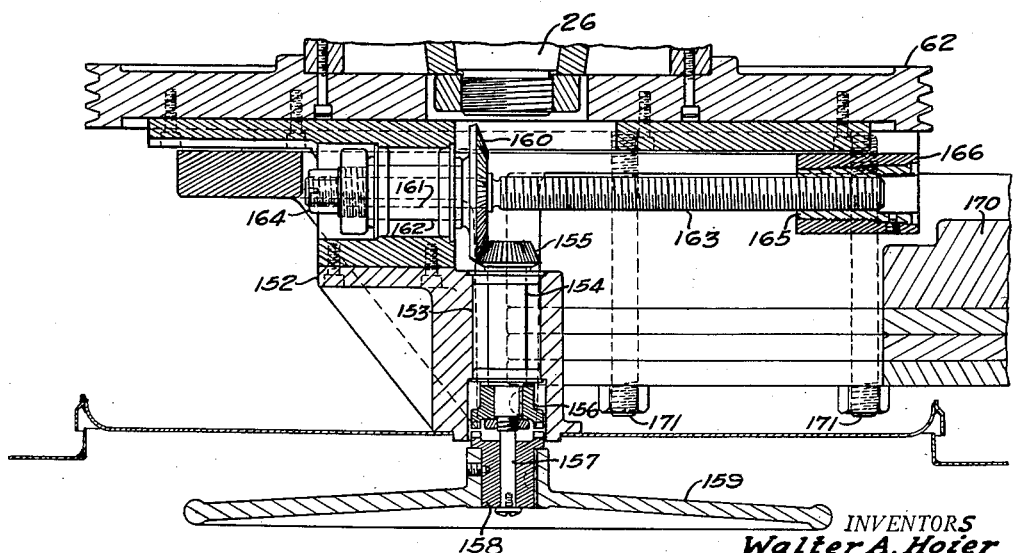
Figure 7 is a detail section on the line 7—7 of Figure 6.

In addition to the auxiliary counterweights which are placed or attached to the face plate, an adjustable counterweight mechanism is provided and secured to the opposite end of the spindle, and this mechanism is shown more particularly in Figures 5, 6, and 7. This mechanism is capable of adjustment while the crankshaft is being rotated. Referring more particularly to Figure 7 a bracket, indicated generally by the reference numeral 152, is secured to the rear face of the driving pulley 62 which is located centrally of the spindle 26. This bracket is formed with a bore 153 which is located coaxially with the axis of the spindle 26 and in this bore is journaled a shaft 154 which has a bevel pinion 155 attached to one end, and a clutch member 156 keyed to the other end. The shaft 154 has an integral reduced portion 157 projecting beyond the clutch member 156 and mounted on this reduced portion is a second clutch member 158 formed integral with a hand wheel 159.

The bevel pinion 155 meshes with a bevel gear 160 which has a hub portion 161 journaled in a bearing 162 carried by the bracket 152. An adjusting screw 163 has a plain cylindrical end which passes through the hub of the gear and is secured thereto by a clamping nut 164. The adjusting screw 163 is threaded in a unt 165 formed integral with a cross slide 166 and this cross slide, as shown in Figure 5, is guided by surfaces 167 and 168 formed in the face of the pulley 62 and held in position by gibs 169. The cross slide 166 carries a series of counterweights 170 which are secured to the cross slide by suitable clamping bolts 171. The cross slide 166 carries an indicator 172 which is adapted to cooperate with fixed marks 173 for indicating the position of the counterweights for a given size and weight of work piece whereby the operator may more readily duplicate a set-up for a given work piece.

The counterbalancing operation is caried out by causing rotation of the motors, and each motor is provided with an ammeter 174 which is connected in series with the motor armatures, as shown in the circuit in Figure 39, and when the spindles are out of balance the uneven torque on the motors will cause fluctuation of the ammeter needles. The counterweights are therefore adjusted until this fluctuation is reduced to a minimum. During rotation of the spindles it will be obvious that if the hand wheel 159 is merely clutched into engagement with the pinion 155 and held against rotation that the bevel gear 160 rotating with the spindle and about the axis of the held pinion 155 will cause rotation of the screw 163 in one direction and thereby adjustment of the counterweight in one direction. If adjustment is desired in the other direction the hand wheel 159 is rotated in the opposite direction, but at a faster rate than the rate of rotation of the spindle.

When a new work piece is placed in the machine the headstock is clamped in a stationary position and the tailstock is withdrawn by means of the motor operated mechanism previously described, and after the work is aligned with the centers the motor is reversed and the tailstock moved into engagement with the center of the work. It is still desirable that a certain amount of resiliency be incorporated in the work supporting means, and this is accomplished by positively holding the headstock spindle against axial movement and exerting a resilient pressure on the tailstock center to hold the same firmly in engagement with the work while still providing a certain amount of yield. As shown in Figure 36, the headstock spindle 76 has a flange 175 rigidly secured thereto between a shoulder 176 formed on the spindle and a clamping nut 177 which is threaded on the spindle. This flange runs between two guide plates 178 and 179 which are secured together by a series of clamping bolts 180 and the entire assembly is secured to a fixed part 181 of the headstock unit by clamping bolt 182.

The tailstock spindle 26 is similarly provided with a flange member 175 but the guide plate assembly, indicated generally by the reference numeral 183, has one or more piston members 184 projecting therefrom which slide in cylinders 185 formed in a fixed part of the tailstock casting. The unit 183 is held against rotation by a locating pin 186. The cylinder 185 is provided with a port 187 through which hydraulic pressure is admitted to exert an axial urge on the spindle 26 in a direction to hold the tailstock center in engagement with the work.

Figures 10, 11:
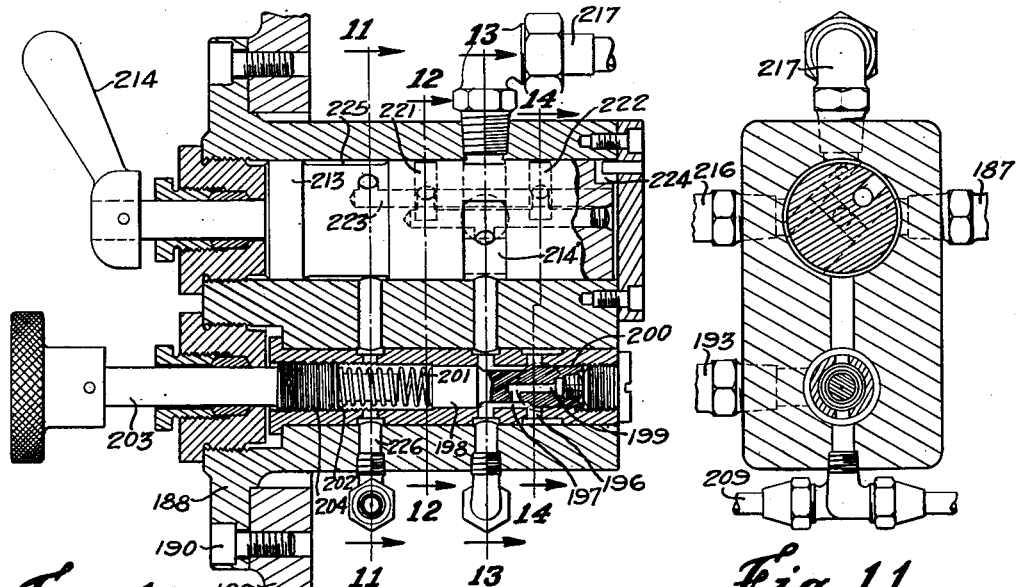
Figure 10 is a vertical section through the control valve taken on line 10—10 of Figure 5.
Figure 11 is a cross section on the line 11—11 of Figure 10.

Power operation of these pistons is controlled by a control valve which is shown in Figures 10, 11, 12, and 13 of the drawings. Referring to Figure 14 the reference numeral 188 indicates the valve block which, as shown in Figure 10, is attached to a mounting plate 189 as by suitable screws 190 and this plate is attached to the upper part of the tailstock as shown in Figure 5, by suitable mounting screws 191. The valve block 188 has a pressure port 192 as shown in Figure 14 to which a pressure supply pipe 193 is connected. This pipe may lead to any suitable source of pressure not shown but preferably to a motor driven pump self-contained within the tailstock. The pressure port 192 is in constant communication with an annular groove 194 formed in the periphery of a valve bushing 195.

Radial holes 196 drilled in the bushing communicate with an annular groove 197 formed in a throttle valve plunger 198 which is recipocable within the bushing. An interdrilled passage 199 formed in the plunger serves as communication between the annular groove 197 and the end of the bore 200 in which the plunger slides and tends to continuously urge the plunger toward the left as viewed in Figure 10 and thereby throttle the ports 196. The plunger is restrained against movement by means of a spring 201 interposed between the end of the plunger and a shoulder 202 formed on the end of a throttle adjusting rod 203 which is threaded at 204 in the end of the bushing. It will be apparent that for a given adjustment of the rod 203 and a substantially uniform pressure on the end of the plunger that any desired throttling of the source of supply may be obtained.

Figures 12, 13, 14:
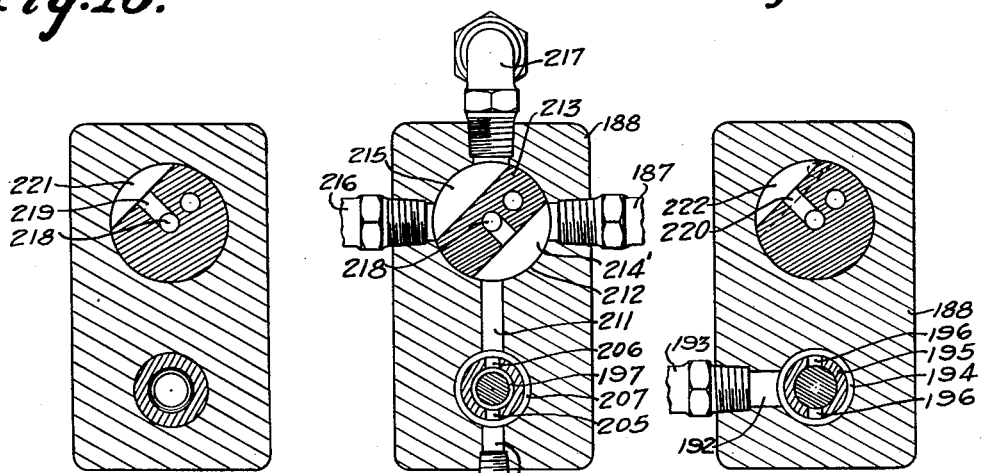
Figure 12 is a cross section on the line 12—12 of Figure 10.
Figure 13 is a cross section on the line 13—13 of Figure 10.
Figure 14 is a cross section on the line 14—14 of Figure 10.

The annular groove 197 is in constant communication with radial ports 205 and 206 shown more particularly in Figure 13. These ports communicate with an annular groove 207 formed in the bushing. A port 208 which intersects the annular groove 207 has a pipe connection 209 which leads to a pressure gauge 210 shown in Figure 5 of the drawings. Thus, by adjusting the rod 203 and watching the pressure gauge 210, the operator is enabled to determine the end pressure of the work supporting spindle 26 against the end of the work. A drilled passage 211 in the valve block 188 connects the annular groove 207 with a bore 212 in which is rotatably mounted a reversing valve plunger 213. This plunger is rotatable by a handle 214 attached to the end thereof as shown in Figures 5 and 10. In the position of the parts shown in Figure 13 the plunger 213 has a first passage 214' formed therein which connects the supply passage 211 to channel 187 which leads to the right hand end of cylinder 185 and a second passage 215 formed therein which serves to connect the pipe 216 which leads from the left end of cylinder 185 to an exhaust pipe 217. It will be obvious that by rotating the plunger 213 in a clockwise direction as viewed in Figure 13 that the connections to opposite ends of the cylinder 185 may be reversed, thereby relieving the axial pressure on the spindle.

It will be noted that the pressure groove 214' formed in the reversing valve plunger is cut in one side of the plunger, thereby creating a lateral thrust on the plunger which might cause binding and therefore to counteract this an interdrilled passage 218 is formed in the plunger in communication with the pressure groove 214' and is provided with two outlet ports 219 and 220 as shown in Figures 12 and 14 respectively which communicate with independent chambers 221 and 222 formed in the opposite side of the valve member. It will be noted from Figure 10 that these chambers are formed on opposite sides of the pressure chamber 214' and thereby serve to equalize the lateral forces on the valve member. The valve member is also provided with an interdrilled passage 223 which serves as a drainage for the space 224 at the end of the valve member and this drainage flows into an annular groove 225 formed in the valve member which is in communication with exhaust port, indicated generally by the reference numeral 226, and which is so arranged as to also drain the chamber containing the spring 201.

It will now be seen that from the foregoing mechanism that the end pressure on the work may be adjusted by the throttle valve mechanism under control of rod 223 and that the pressure may be turned on or off by the reversing valve 213.

Figure 23:
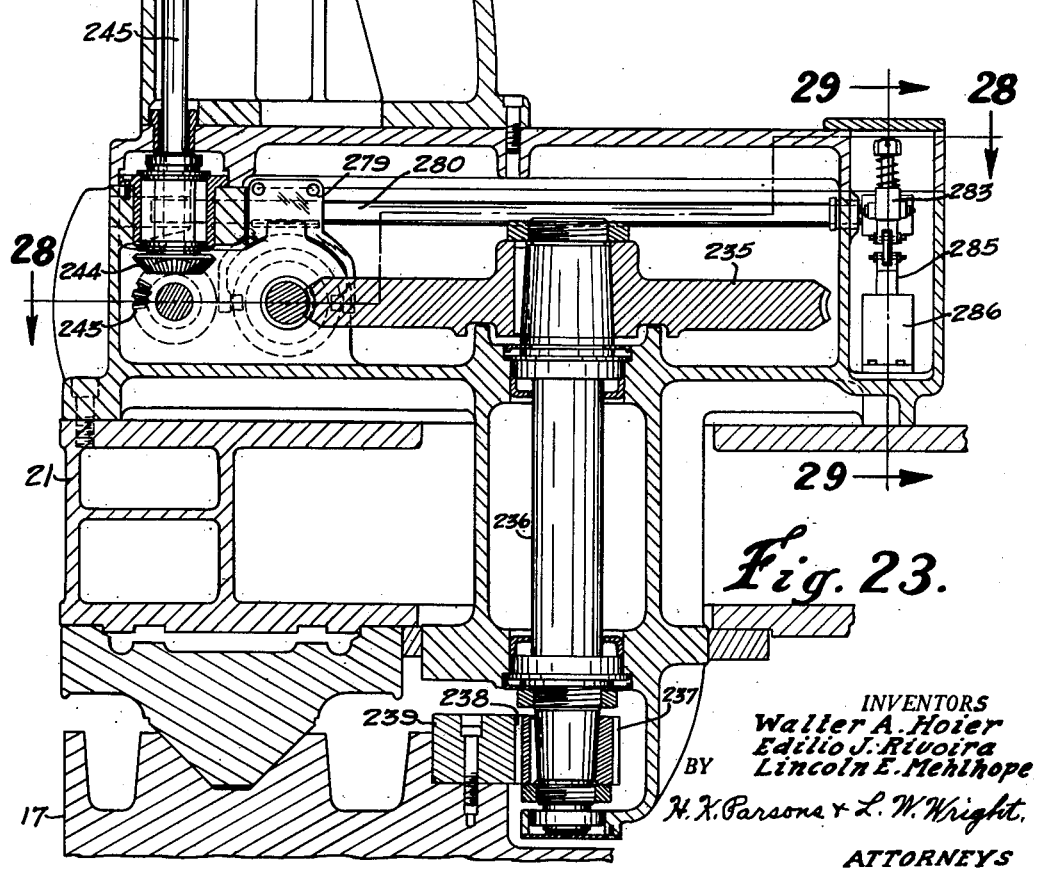
Figure 23 is a cross sectional view of the cross feed mechanism for the grinding wheel slide.

The traveling carriage 21 which carries the grinding wheel cross slide 23 is driven by the mechanism more particularly shown in Figures 23 and 28. As there shown, a prime mover 227 is connected by shafting, indicated generally by the reference numeral 228, to a pinion 229 which intermeshes with a spur gear 230. The spur gear 230 is supported for free rotation on a shaft 231, and this shaft has slidably keyed thereto a shiftable clutch member 232 which may be shifted upward as viewed in Figure 28 to interengage clutch teeth 233 whereby the gear 230 will rotate a worm 234 in mesh with a large worm gear 235. The worm gear 235, as shown in Figure 23, is keyed to the upper end of a vertical shaft 236 which carries a rack pinion 237 secured to the lower end thereof in mesh with rack teeth 238 of a rack 239 secured to the rear bed 17. The motor 227 is a reversible direct current variable speed motor and therefore the direction and rate of rotation of the motor is determined by a control circuit which will be described later.

In addition to power operation of the traversing support, means are also provided whereby the support may be manually traversed from different stations at the machine. For manual actuation, the clutch member 232 is clutched into engagement with gear 240 which is supported for free rotation on the shaft 231, and this gear intermeshes with gear 241 secured to the end of a shaft 242 supported for rotation in the frame of the carriage 21. A bevel gear 243 secured to this shaft intermeshes with a bevel gear 244 secured to the end of a vertical shaft 245. The shaft extends upward through a pedestal 246 as shown in Figure 24 and at the upper end has a bevel gear 247 secured thereto which intermeshes with a bevel gear 248. A bevel gear 248 is secured to the end of a shaft 249 as shown in Figure 22.

The shaft 249 is journaled in a horizontally extending bracket 250 which extends to the front of the machine over the top of the work and which is formed integral with a sleeve 251, which sleeve is supported on anti-fraction bearings 252 and 253 on the pedestal 246. The purpose of this is so that the bracket 250 may be swung to suit the convenience of the operator. As shown in Figure 27, the shaft 249 is provided with a gear 254 which is journaled on anti-friction bearings 255 in the bracket 250 and this gear is also provided with an internal gear 256. The gear 254 is connected through reduction gearings comprising a pinion 257 and integral gear 258, the latter meshing with gear 259 secured to the end of shaft 260. The shaft 260 is slidably keyed at 261 in a sleeve 262 which is held against axial movement and supported by anti-friction bearings 263. The sleeve 262 has a hand wheel 264 keyed thereto at 265. It will thus be obvious that by rotation of the hand wheel 264 with the parts in the position shown in Figure 27 that movement of the traversing carriage may be controlled from the front of the machine as shown in Figure 2.

The shaft 260 is provided with an operating knob 266 whereby the shaft may be shifted axially from the position in which it is detained by the detent ball 267 to a second position in which the ball is detented in the bore 268. In this position the gear 259 is shifted out of mesh with the gear 258 into an intermediate position whereby the hand wheel 264 is rendered inoperative. Further movement of the shaft 260 to a position in which it is detented by the bore 269 moves the gear 259 into mesh with the internal gear 256, thereby giving a more direct drive to the shaft 249 whereby the carriage may be moved at a faster rate per revolution of the hand wheel 264.

The sleeve 251 is clamped to the pedestal 246 by the means shown in Figure 25 comprising a split 270 which surrounds the pedestal 246 intermediate the pedestal and sleeve; and the sleeve is provided with a pair of adjusting screws 271 for clamping the sleeve 270 to the pedestal 246. The outer sleeve 251 carries a stop pin 272 which is movable between shoulders 273 of a stop ring 274 which is secured to the pedestal by T-bolts 275. The shoulders 273 serve to limit the arc of movement of the bracket 250.

Additionally, the manually operable shaft 242 shown in Figure 28 may be operated by a hand wheel 273 which is located on the opposite side of the work handwheel 264 as shown in Figure 2 when the operator is stationed on platform 273'. Referring to Figure 35, it will be noticed that the hand wheel 273 is slidably mounted on a shaft 274 whereby it may be shifted to interengage clutch teeth 275' and thereby connect the hand wheel for rotation of sprocket gears 276. These sprocket gears are connected by chains, indicated diagrammatically by the reference numeral 277, to sprocket wheels 278 shown in Figure 28 as attached to the end of shaft 242. Thus, the carriage may be manually operated from either one of two control positions.

Referring to Figures 23 and 28 the selector clutch 232 which determines between manual and power operation of the carriage is normally held in a manual control position. This is accomplished by mounting the clutch shifter fork 279 on a rotatable shaft 280 as shown in Figure 23, and this shaft is supported at 281 and 282 in the frame 21. One end of the shaft is provided with a bell crank 283, Figure 29, one arm of which is continuously actuated by a spring pressed plunger 284 to maintain the clutch 32 engaged on the manual side. The other arm of the bell crank is connected to an armature 285 of a solenoid 286 whereby upon actuation of the solenoid through control means to be later described, the clutch is shifted to its power side upon energization of the power control means.

Attention is invited to the fact that the swinging bracket 250 is normally held in one position by the pin 272 which interengages a notch 287 formed in the locking ring 274, and when it is desired to rotate the bracket to some other position the pin 272 is withdrawn against the resistance of a spring 288 by means of the rack and pinion connection 289 shown in Figure 31 by which the shaft 290 is connected to a horizontally rotatable shaft 291. This shaft extends to the outer end of the bracket 250 where it is provided with a manually operable handle 292. Thus, by rotating the handle 292 the pin 272 may be withdrawn and the bracket 250 swung to different positions but not beyond the limits of the stop shoulders, and upon release of the lever 292 the pressure of the spring on the pin affords a certain frictional engagement to hold the parts in a given position.

Figure 17:
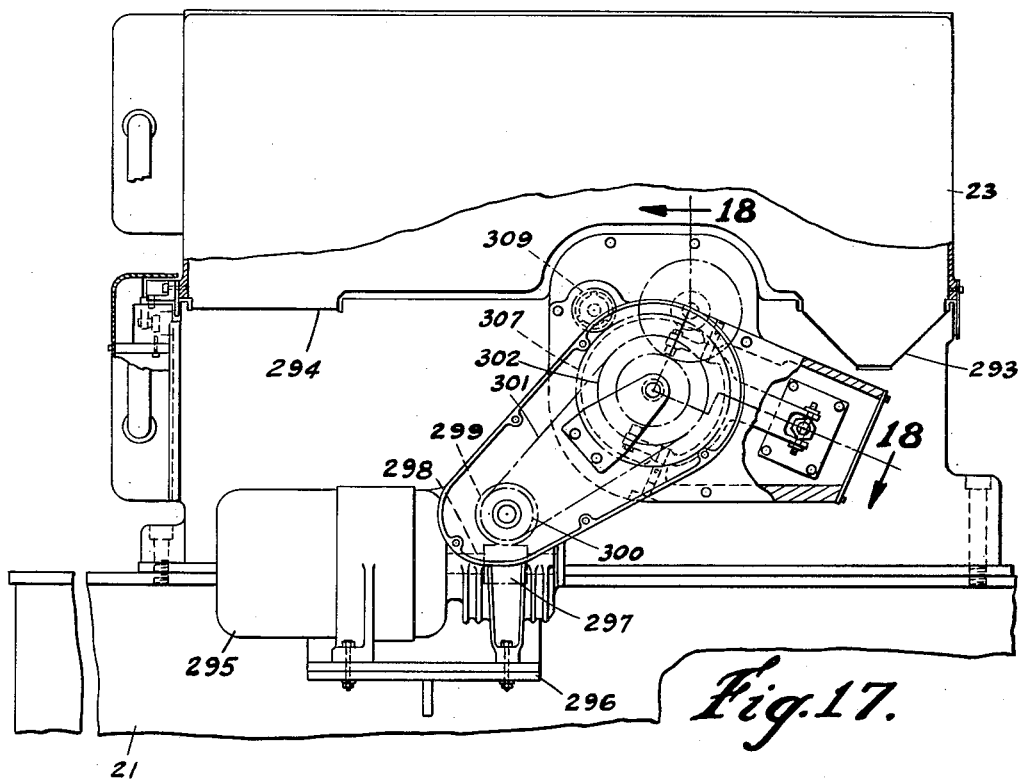
Figure 17 is a vertical section on the line 17—17 of Figure 3.
Figure 18:
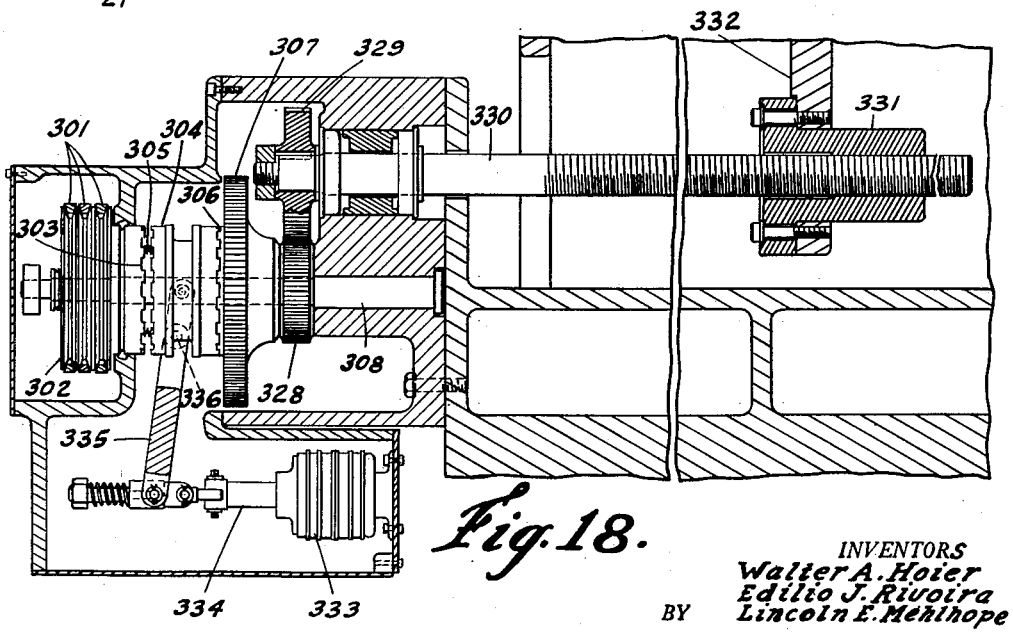
Figure 18 is a detail section on the line 18—18 of Figure 17.
Figure 20:
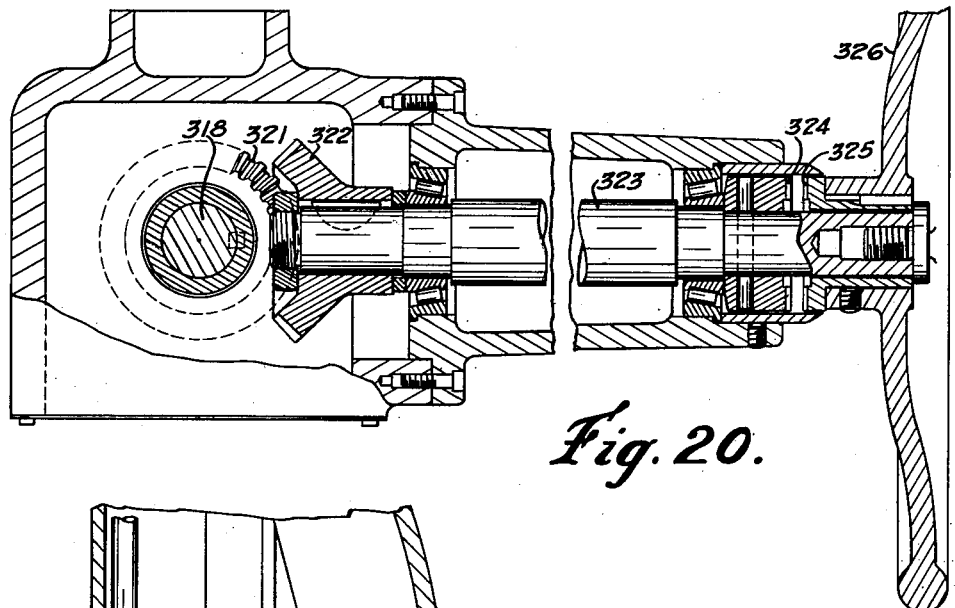
Figure 20 is a section on the line 20—20 of Figure 19.

Referring now to Figures 17 and 18 there is shown the power drive mechanism by which the wheel head cross slide 23 may be reciprocated on the guideways 293 and 294 formed on the traveling carriage 21. This transmission mechanism comprises an electric motor 295 which is supported on a bracket 296 carried by the traveling carriage 21 and the motor has a worm 297 secured to its armature shaft 298. This worm drives a worm gear 299 which has integrally connected therewith a multiple V-belt pulley 300. This pulley is connected by a series of V-belts 301, as shown in Figure 18, to a V-belt pulley 302. This pulley has integral formed clutch teeth 303 for engagement with similarly formed clutch teeth on shiftable clutch member 304. This clutch member is normally held, however, by springs 305 into engagement with clutch teeth 306 formed on the face of a manually operable gear 307. The gear 307 is, of course, mounted for free rotation on the supporting shaft 308 to which the clutch member 304 is slidably splined and intermeshes with a pinion 309. The pinion 309 is secured to the end of a horizontal shaft 310 as shown in Figure 21, and this shaft has a sliding spline connection at 311 with a bevel gear 312 which is journaled in a depending bracket 313 of the wheel slide 23. Also mounted in the bracket 313 is a vertical shaft 314 which carries a bevel pinion 315 on the lower end in mesh with bevel gear 312, and a bevel gear 316 on the upper end, as shown in Figure 19, in mesh with a bevel gear 317 attached to the end of a manually operable shaft 318. The shaft 318 is journaled in a horizontally extending bracket 319 integral with the upstanding pedestal 320, and this bracket extends to the front of the machine as shown in Figure 2. As shown in Figure 20, the shaft 318 has a bevel pinion 321 keyed thereto and meshing with a bevel pinion 322 secured to the end of a manually rotatable shaft 323. This shaft carries clutch teeth 324 adapted to be engaged by clutch teeth 325 of a hand wheel 326 which is operable from the platform 273' on the traveling carriage. In addition, the shaft 318 extends to the end of the bracket 319 where it is provided with a second manually operable hand wheel 327, which is operable from the front of the machine. Thus, the cross slide may be manually actuated from either one of two positions to feed the grinding wheel into the work. A stop mechanism indicated generally by the reference numeral 327', Figure 19, is provided in conjunction with handwheel 327 to limit the extent of movement.

The shaft 308 has a spur gear 328 keyed thereto which intermeshes with a spur gear 329, Figure 18, keyed to the end of the cross slide feed screw 330. This feed screw intermeshes with a nut 331 mounted in a bracket 332, depending from the underside of the cross slide 23. Since the clutch member 304 is normally maintained in engagement with the manually operable gear 307 the cross slide may be actuated at any time when power is not connected, but when the motor 295 is actuated a solenoid 333 is simultaneously energized which causes its armature 334 to oscillate the clutch shifting lever 335, to which it is connected, about its pivot 336 to cause shifting of the clutch 304 into engagement with the power operable clutch teeth 303.

In order to control the limits of reciprocation of the traveling carriage a reduced drive trip dog mechanism is provided which is shown in Figures 32 and 33, and this mechanism derives its power from the mechanism utilized for driving the carriage which is shown in Figure 28. By referring to this figure it will be noted that there is a gear 337 which is in mesh with a gear 338 that is keyed to the shaft 231 whereby any rotation of this shaft will cause actuation of the trip mechanism. The shaft 337 is fastened to one end of a shaft 339 that carries a bevel gear 340 secured to its other end. The bevel gear 340, as shown in Figure 30, intermeshes with a large bevel gear 341 secured to a shaft 342 which is mounted in inclined relation and has a beveled gear 343 on its upper end intermeshing with a bevel gear 344. As shown in Figure 32, the bevel gear 344 is secured to the end of a long screw 345 which is supported at opposite ends for rotation in a trip control bracket 346.

A trip element carrier 347 is threaded on the screw, as shown in Figures 32, 33, and 34. The top of the carrier is provided with an elongated slot 348 in which is secured a first trip element 349 by suitable screws 350. The bottom of the carrier is similarly provided with a slot 351 in which is mounted a second trip element 352 suitably secured therein by screws 353. The carrier 347 is mounted to slide upon a dovetail guideway 354, as shown in Figure 34, and it will be obvious that upon rotation of the screw the carrier 347 will travel along the guideway in a direction dependent upon the direction of rotation of the screw. It should also be noted that due to the reduction in the drive between the traveling carriage drive mechanism and the screw 345 that the carrier 347 will move at a much slower rate than the traveling carriage. Thus, it is not necessary to make the length of the screw 345 equal to the length of travel of the traveling carriage. Between the end bracket 354 and the switch housing 355 which upstand from the base 356 there is rotatably supported a pair of oscillatable dog rails 357 and 358, the former being located above the screw and the latter being located below the screw. The rail 357 has a dovetailed guide 359 formed on the bottom surface to which is clamped an adjustable dog 360 having a V-shaped face 361. The rail 358 also has a dovetailed guideway 362 to which is attached an adjustable dog 363 having a V-shaped face 364. Each of the dogs 360 and 363 is provided with a backing up dog 364 mounted on the respective dog rails. The dog rail 358 is provided with a switch actuating arm 365 which projects therefrom as shown in Figure 34 and the end of this arm is provided with three adjustable set screws 366 which are adapted to engage spring plungers 367, 368 and 369. The plunger 369 is aligned for operation of a limit switch LS2 and the plunger 368 is aligned for operation of a limit switch LS3 and the plunger 367 is aligned for operation of a limit switch LS12. The spring pressed plungers are urged in a direction away from the limit switches and in a direction to cause clockwise rotation of the arm 365 as viewed in Figure 34. Rotation in this direction, however, is limited by a setscrew 370 which is threaded in the underside of the arm 365 and adapted to engage the top surface of the base member 356.

From the foregoing description it should now be apparent that as the pointed end of the trip element 352 engages the bevel surface 364 of the trip dog 363 that the dog rail 358 will be rotated in a counterclockwise direction as viewed in Figure 34; in other words, in a direction to cause upward movement of the trip plungers against the resistance of their springs and operation of the limit switches. Since the rate of movement of the member 347 is at a comparatively slow rate compared to the actual rate of movement of the traveling carriage the rate of rotation of the switch actuating member 365 will be comparatively slow. This makes it possible to adjust the set screws 366 to different lengths of projection in such a manner that the plunger 363 will actuate limit switch LS2 first followed by sequential actuation of limit switches LS3 and LS12.

The purpose of these limit switches as will be explained more fully later in connection with the electrical circuit is to first cause the traveling carriage to slow down to a predetermined low speed caused by operation of switch LS2 and then a stop and reversal effected by switch LS3. The switch LS12 is a safety switch and normally is not actuated.

This will cause reversal in the direction of movement of the carrier 347, and in a reciprocating cycle the trip element 349 will function next to engage the beveled face 361 of the dog 360 causing rotation of the dog rail 357 and thereby of a switch actuating arm 372 which operates on a duplicate control mechanism and will cause sequential actuation first of limit switch LS5 to cause slowdown of the table and subsequent actuation of limit switch LS4 to effect reversal of the table. LS13 is a safety switch.

It will be obvious that by loosening and clamping screws 373 associated with the dogs 360 and 363 that these dogs may be slidably adjusted and positioned to give any desired length of reciprocating travel of the grinding wheel.

The general control circuit for controlling power operation of the machine such as power feeding of the grinding wheel toward and from the work, an automatic reciprocating cycle of the traveling carriage, means for rapid traversing the traveling carriage and suitable interlocks between different parts of the machine to insure safety of operation of the machine is shown in Figure 40 of the drawings. Assuming the operator has set the trip dogs in Figure 32 to determine the limits of a reciprocating cycle of the grinding wheel, the control circuit operates as follows.

Assuming that the first direction of movement of the grinding wheel is to be toward the right the operator depresses the start button 374 which completes a circuit from line 375 through the normally closed limit switch LS4B, line 376, normally closed button 377, line 378, closed contacts 379 of switch 374 and line 380 to relay CR5. This relay latches itself in by closing contacts CR5—1 which completes a circuit around the starting button whereby the starting button may be released by the operator.

The line 375 is connected to the power main through normally closed switches 381 and 382 which are associated with the rapid traverse control circuit and these switches are normally closed when the rapid traverse control circuit is not in use and thereby prevent use of the feed circuit when the rapid traverse circuit is being utilized. In series with these switches is a stop button 383 which is utilized to stop the automatic reciprocating cycle of the traveling carriage at will by the operator. In series with the stop button 383 are a pair of duplicate buttons 384 and 385 located at spaced operating stations on the machine for reinstating manual operation, the function of which will be more fully described later.

The operation of relay CR5 also closes contact CR5—2 which completes a circuit from line 107 through line 386 to relay CR4, and this relay latches itself in by closing contacts CR4—1. Relay CR5 also closes contacts CR5—3 which completes a circuit from line 107 through line 387 to relay CR2 and timer relay TR1 which are connected in parallel to line 387. The operation of these two relays closes contacts CR2—1 and TR1—1 which are connected in series between line 388 and line 389 completing a circuit to relay CR3. This relay latches itself in by closing contacts CR3—1.

The operation of relay CR3 closes switch CR3—2 which completes a circuit to solenoid 286 and thereby shifts the clutch shown in Figure 28 to its power position. The function of the timer relay TR1 is to maintain a circuit to relay CR3, the timer relay being of the type which is instantly closed and timed opened and the timing of the opening is of sufficient duration that during power jogging by a series of short moves it will not cause continuous shifting of the clutch and thereby lengthens the life of the parts. If it is desired, however, to immediately manually operate the carriage after power operation and before the timer relay releases, the operator depresses either button 385 or 384 depending upon his station at the machine and thereby immediately breaks the circuit to CR3 which reinstates manual operation immediately. The closing of relay CR4 closes contacts CR4—2 and the operation of relay CR5 closes contacts CR5—4 in a circuit 390 leading from line 107 to relay CR5A.

Figure 41:
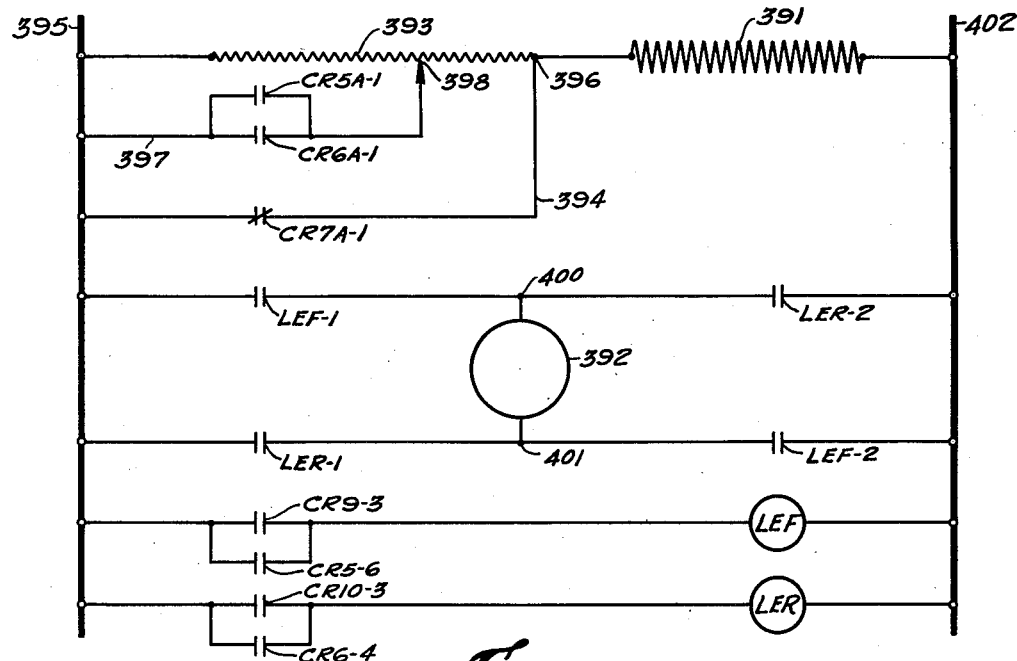
Figure 41 is a diagram of the direct current control circuit for the traversing carriage motor.

Referring to Figure 41 in which is shown the direct current control circuit for the traversing carriage motor 227, the reference numeral 391 indicates the field coil of said motor and the reference numeral 392 represents the armature of said motor. The reference numeral 393 indicates a control resistance in series with the field 391 for varying the speed of the motor and a line 394 connected to the positive supply line 395 short circuits the resistance 393 by being connected to the point 396. A switch CR7A in line 394 is a normally closed switch and establishes the lowest or creep speed of the motor. A second line 397 in parallel with line 394 has a variable contactor 398 for cutting out various portions of the resistance 393 to increase the speed of the motor and this contactor may be adjusted to establish a desired rate of reciprocation of the carriage for the grinding operation and for convenience may be termed the grind feed rate.

When the relay CR5A is energized it closes contact CR5A—1 and thereby completes the circuit through line 397. At the same time the relay CR5 has closed a contact CR5—5 in line 399 completing a circuit from line 375 through normally closed limit switch LS5—B and normally closed contact CR6—5 to relay CR7. The operation of relay CR7 closes contacts CR7—1 which completes a circuit from line 390 to relay CR7A. The operation of relay CR7A opens switch CR7A—1 in line 394 whereby the resistance 393 establishes a grind feed rate.

The relay CR5 is also a direction control relay and upon its operation it closes switch CR5—6 in Figure 41 which operates starter relay LEF which has contacts LEF—1 and LEF—2 which closes a circuit from line 395 to one end 400 of armature 392 and the other end 401 to the negative side 402.

The circuit is now established to cause travel of the carriage to the right at a grind speed depending on the setting of the rheostat control 398.

This motion will continue until the trip element 349 engages dog 361, thereby rotating bar 357 and attached block 372 which first causes operation of limit switch LS5 and subsequently operation of limit switch LS4 as shown in Figure 33. Referring to Figure 40, the operation of limit switch LS5 opens contact LS5B, thereby breaking the circuit to relay CR7 which, in turn, opens contacts CR7—1, thereby breaking the circuit to relay CR7A which, in turn, causes contacts CR7A—1 Figure 41 to resume their normally closed position, thereby short circuiting rheostat 393 and establishing a creep speed operation of the carriage. The object of this is to reduce the speed of the carriage to a standard low speed before final stoppage to insure against overrun of the carriage.

The subsequent operation of limit switch LS4 opens the normally closed contacts LS4—B, Figure 40, thereby breaking the circuit to relay CR5. This, of course, will open all the contacts associated with the relay CR5 from CR5—1 to CR5—6 inclusive with the result that the circuit to a relay CR5A will be broken, thereby opening contact CR5A—1 in line 397. At the same time contact CR5—6, Figure 41, will open, breaking the circuit to starter LEF which will open contacts LEF—1 and LEF—2, thus breaking the circuit to the armature 392. Since the motor 227 is equipped with dynamic breaking, it will be apparent that the carriage can be immediately stopped due to its slow rate of travel, thereby obtaining accurate reversal which is so essential when grinding between shoulders of a crank pin.

As the same time that limit switch LS4 opened contacts LS4B it simultaneously closed contacts LS4—A in a circuit comprising line 403 leading from line 375 and containing contact CR4—3 which at this time is closed due to the fact that relay CR4 is energized, thereby completing a circuit through LS4—A to timer relay TR2. This relay is of the type that has timed closing and instantaneous opening. It will, therefore, be apparent that after a predetermined tarry of the carriage that the timer relay TR2 will close and this will cause closure of contacts TR2—1 which are located in a circuit from line 375 through line 404, normally closed contacts LS3—B, switch 374, line 405 to line 406 which leads to relay CR6. The operation of relay CR6 sets up a circuit to cause movement of the carriage to the left.

In other words, operation of this relay closes contacts CR6—1 which completes a circuit to relay CR6A and this relay has contacts CR6A—1 as shown in Figure 41 which completes a circuit to the adjustable rheostat contactor 398. The relay CR6 latches itself in around timer relay contact TR2—1 by the closure of contacts CR6—2. Relay CR6 also closes contacts CR6—3 in line 407 which completes a circuit from line 375 through normally closed contact LS2B and normally closed contact CR5—7 to relay CR8. The operation of relay CR8 closes contacts CR8—1 which closes a circuit from line 390 to relay CR7A thereby opening the normally closed contact CR7A—1 in Figure 41, and establishing a grinding feed rate of the carriage in a left hand direction.

Operation of relay CR6 also closes contact CR6—4 in Figure 41 which completes a circuit to starter LER which closes contacts LER—1 and LER—2 which reverses the connections to the armature 392, thereby causing reverse rotation of the motor.

When the table reaches the limit of its travel toward the left the trip mechanism first operates a limit switch LS2, thereby opening the normally closed limit switch LS2—B which breaks the circuit to CR8, thereby opening contact CR8—1, breaking the circuit to relay CR7A so that contact CR7A—1 resumes its normally closed position, establishing a short circuit around the rheostat 393 and creating a creep speed of the carriage. A short time thereafter the limit switch LS3 is operated which opens the normally closed contact LS3—B, thereby breaking the circuit to relay CR6 and closing contacts LS3—A, establishing a circuit through closed contacts CR4—4 to timer relay TR3. The deenergization of relay CR6 opens contacts CR6A—1 and CR6—4 in Figure 41, thereby stopping the motor. The timer relay TR3 will eventually time close, thereby reestablishing a circuit by the closing of contact TR3—1 through normally closed contact LS4—B, switch button 377 to line 380 causing operation of relay CR5. This will result in a new cycle of operation toward the right in the manner previously described.

When it is desired to stop the reciprocating cycle the operator presses the stop button 383 which thereby breaks the circuit to relay CR4 and also breaks the circuit to line 375, thereby rendering the entire circuit dead and requiring operation of one of the start buttons 374 or 377 to initiate a new cycle of operation.

Rapid traverse operation of the traveling carriage may be obtained by depressing control button 408 for rapid traverse to the right and button 409 for rapid traverse to the left. Depressing button 408 completes a circuit from line 410 through button 409 and line 411 to line 412 causing operation of relay CR9. This relay will close contact CR9—1 in line 390 and contact CR9—2 in line 413, causing operation of relay CR7A. Referring to Figure 41, the operation of CR9 will cause closing of contacts CR9—3 operating the starting relay LEF, thereby completing a circuit through armature 392 through contacts LEF—1 and LEF—2. At the same time operation of relay CR7A will open contact CR7A—1, and since contacts CR5A—1 and CR6A—1 are open the entire resistance 393 will be in series with the field 391 thereby causing rapid traverse operation of the motor 227.

Similarly, depression of button 409 to obtain rapid traverse to the left will complete a circuit from line 410 through button 408, line 414 and line 415 to relay CR10. Operation of this relay will close contacts CR10—1 in line 390 and CR10—2 in line 416, again completing a circuit to relay CR7A which will cause the entire resistance 393 to be cut in series with the field 391. Relay CR10 will also close contact CR10—3 to complete the circuit in Figure 41 to starter LER which will complete a circuit through the armature 392 in the opposite direction through contacts LER—1 and LER—2. Attention is called to the fact that the relays CR9 and CR10 also have contacts CR9—4 and CR10—4 in parallel in line 387 to cause operation of relay CR2 and timer relay TR1. The operation of these relays is similar to that previously explained to prevent intermittent operation of clutch solenoid 286 during jogging operations of the circuit.

For safety reasons certain interlocks are provided to prevent the use of the power rapid traverse for the traveling carriage unless the grinding wheel carriage is in a return position and the work supporting spindles are stopped. Additionally, interlock limit switches are provided to prevent the traveling carriage from moving past the headstock or tailstock regardless of their adjusted positions.

Referring to Figure 38 there is shown the interlock between the footstock 14 and the traveling carriage 17 comprising the limit switch LS10 which is mounted for movement with the traveling carriage and a cam plate 417 which is attached to the footstock whereby if one moves past the other the cam portion 418 will cause operation of the limit switch LS10 to open the switch. It will be noticed that this limit switch is effective regardless of whether the carriage is the stationary member and the footstock the movable member or vice versa.

Similarly, in Figure 35 is shown the interlock switch LS11 which is carried by the traveling carriage 17 and a cam plate 419 which is carried by the headstock 13 whereby if one moves by the other the cam portion 420 will cause operation of the limit switch and open the same.

The limit switches LS10 and LS11 are connected in series as shown in Figure 40 from the line 107 to the line 421, which has a branch connection 422 in which is serially arranged a limit switch LS8—1 and a limit switch contact LEJ—1. The contact LS8—1 is part of limit switch LS8 which as shown in Figure 21 is carried by the subbase of traveling carriage 17, and mounted on the grinding wheel carriage is a dog 423 which is adapted to engage the limit switch LS8 when the grinding wheel carriage 23 is in its fully returned or retracted position. When this happens the contacts LS8—1 are closed. The contacts LEJ—1 are part of relay LEJ which controls power rotation of the spindles and when the relay LEJ is not energized the contacts LEJ—1 resume their normally closed position. It will thus be seen that so long as there is no interference between the traveling carriage and the two headstocks that limit switches LS10 and LS11 remain closed and that when the grinding wheel carriage is in its completely returned position the contacts LS8—1 are closed, and if the spindles are stopped the contact LEJ—1 is closed whereby the rapid traverse mechanism may be operated.

Similarly, the line 421 has a branch connection 424 which leads to the control buttons 44R and 44L which control the right and left hand starters 425 and 426 for the headstock power traverse motor. Therefore, so long as there is no interference between the headstock and the traveling carriage the power traverse of the headstock may be obtained.

Control mechanism is also provided for controlling the motor 294 for the cross slide 23 which is shown in Figure 17. Starter buttons 427 and 428 are provided in the circuit shown in Figure 40 for controlling this operation, the button 427 causing retraction of the grinding wheel and button 428 causing advance of the grinding wheel. When the button 427 is depressed it closes a circuit from line 107 through line 429 which contains a pair of stop buttons 430, line 431, normally closed button 428, line 429' and closed contacts 430' to line 431' connected to relay CR13. This relay latches itself in by closing contacts CR13—1 which short circuits the push button 427 and permits it to be released. Relay CR13 also closes contacts CR13—2 to cause operation of the starter relay 432. To cause power advance of the grinding wheel the operator depresses button 428 which completes a circuit from line 429 through button 427 and line 433 to line 434 and thereby to relay CR14. This relay closes contact CR14—1 in circuit with the starter 435 for motor 295 which causes rotation of the member in the opposite direction.

Attention is invited to the fact that the grinding wheel carriage 23 is provided with a second limit switch LS9 which is mounted on the carriage 17 and a trip dog 436 is mounted on the slide 23 for limiting extreme advance of the grinding wheel carriage. These limit switches have contacts LS8—2 and LS9—2 in series with the starters 432 and 435 to prevent their operation in case the grinding wheel slide is in either extreme position.

A common line 437 supplies current to the starters 432 and 435 and this line is connected through a pair of control buttons 438 to line 107.

It will be noted that when the cross slide is moving back that the relay CR13 is provided with a latching circuit which necessitates operation of stop button 430 to stop the cross slide before it reaches its extreme rear position whereas during the forward movement no latching circuit is provided and the mere release of the button 428 will stop the forward movement. This facilitates jogging the grinding wheel toward the work by the use of a single button.

When either relay CR13 or CR14 is operated it will close their contact R13—3 or CR14—2 which are connected in parallel between buttons 438 and relay CR11 and timer relay TR4. These latter two are connected in parallel to line 439. The timer relay TR4 is of the type which is instantaneously closed and time opened. The relay CR11 closes contact CR11—1 and the timer relay TR4 closes contact TR4—1, thereby completing a circuit to relay CR12. The relay CR12 latches itself in by closing contacts CR12—1. It also closes contacts CR12—2 which is in a circuit for operating solenoid 333 which controls the clutch shown in Figure 18. In other words, during power operation of the cross slide the solenoid 333 is energized and maintains the clutch in its power position. The timer relay TR4 serves to maintain the circuit during intermittent operation of either the push buttons 427 or 428. This circuit may be immediately broken, however, by operation of the push buttons 438.

In connection with Figure 32, attention is invited to the fact that an additional safety limit switch LS12 is provided in conjunction with limit switches LS2 and LS3 and limit switch LS13 is provided in conjunction with limit switches LS4 and LS5 and the set screws for operating these switches are so adjusted as to act subsequently to the operation of the other limit switches for safety purposes and in the event that for some reason the other switches should fail to stop the traveling carriage. These switches are connected in series in line 107 as shown in Figure 40 and are normally closed but upon opening will break the entire control circuit and thereby stop the operation of the moving slides. It then becomes necessary for the operator so manually operate the particular slide in question to release these switches and thereby close the circuit for subsequent operation.

To assist the operator in setting up the length of stroke for carriage, there have been provided two pilot lights for use in conjunction with the limit switches LS3—A and LS4—B. As shown in Figure 40, the pilot light 440 is connected in series with switch LS4—A and light 441 in series with switch LS3—A. Thus, whenever either of these switches are closed, regardless of the operation of relay CR4, the lights will be lit. It will now be obvious that after the operator has positioned the traveling carriage at one of its strokes, the operator positions the appropriate dog 360 or 363 in approximate position and then sets and locks the backing up dog 364, and by means of the micrometer adjustment on the backing up dog can adjust dog 360 or 363 until its contacts just close which will be determined and assured by the lighting of the pilot light.

There has thus been provided an improved grinding machine for grinding large crankshafts which, although having large heavy movable parts, may be as readily controlled as smaller machines, and which is provided with suitable interlocks to prevent collision between moving parts which are difficult to watch in such a large machine.

What is claimed is:

1. In a grinding machine having a work support and a grinding wheel support, manually operable means for feeding the grinding wheel support toward the work support, power operable means for moving the grinding wheel support toward and from the work support, a first control for said power means adapted to be manually held to effect power movement of the grinding wheel support toward the work support, a second control for said power means adapted to be latched in to cause retraction of the grinding wheel support, and automatic means for unlatching said second control to stop said retraction at the end of its stroke.

2. In a grinding machine having a work support, a traveling carriage, and a grinding wheel support mounted on the carriage for movement toward and from the work support, power operable means for moving the grinding wheel support toward and from the work support and relative to the carriage, said power operable means including a control for causing retraction of the grinding wheel support to its extreme rear position, a rapid traverse control circuit for the traveling carriage, a source of power for said circuit, and means rendered automatically operable upon completion of retraction of the wheelhead to stop said retraction and simultaneously connect power to said rapid traverse control circuit.

3. In a grinding machine having a work support, a traveling carriage, and a grinding wheel rotatably mounted on the carriage, the combination of trip control mechanism for limiting reciprocation of the carriage including trip elements movable in synchronized relation to the wheelhead, limit switches operable by said elements, and visual means for indicating when a trip dog has established contact with a limit switch.

4. In a grinding machine having a work support, a pair of spindles journaled on the work support for supporting a crankshaft therebetween, power operable means for rotating said spindles, counterbalances mounted on the end of each spindle, means to effect rotation of the spindles, and means to adjust said counterbalances radially of the spindle axis during said rotation.

5. In a grinding machine having a work support, a pair of spindles journaled on the work support for supporting a crankshaft therebetween, power operable means for rotating said spindles, counterbalances mounted on the end of each spindle, means to cause rotation of the spindles, means to adjust said counterbalances radially of the spindle axis during said rotation, means including a part fluctuable in response to out-of-balance conditions, and means to adjust said counterbalances to obtain minimum fluctuation of said part.

6. In a grinding machine having a work support including a headstock and a tailstock, power operable means for adjusting said tailstock toward and from the headstock, a traveling carriage mounted for reciprocation parallel to the movement of the tailstock, power operable means for traversing said carriage, and an interlock mechanism to prevent either the tailstock or the carriage from being adjusted past the other.

7. In a grinding machine having a work support for rotatably supporting a work piece, the combination of a traversing carriage movable parallel to the work support, a grinding wheel slide mounted on the carriage for movement toward and from the work support and having an extreme rear position, power operable means for traversing said carriage including a rapid traverse control circuit, and means responsive to movement of the grinding wheel support away from its extreme position for rendering said rapid traverse circuit inoperative.

8. In a grinding machine having power operable work rotating means including a control circuit having start and stop means, a traversing carriage movable parallel to the work supporting means, a grinding wheel support mounted on the carriage for movement toward and from the work support and having an extreme rear position, power operable means for said carriage including a rapid traverse control circuit, and means responsive to movement of the grinding wheel support away from its extreme position or to said first-named circuit when coupled for power operation to render said rapid traverse control circuit inoperative.

9. In a grinding machine having a work support and grinding wheel support, the combination of transmission mechanism for effecting relative movement between said supports, manually operable means for actuating said mechanism, connecting means normally positioned to connect said manually operable means to said transmission mechanism, a power operable means including a control circuit therefor, means responsive to energization of said circuit to cause operation of said power operable means, and simultaneously shift said connecting means to disconnect said manually operable means and connect said power operable means to said transmission mechanism, and means in said circuit for maintaining the connection of said power operable means to said transmission mechanism during short interruptions in the energization of said circuit whereby said circuit may be utilized for jogging said power operable means without interrupting the connection thereof with said transmission mechanism.

10. In a grinding machine having a work support and a grinding wheel support, the combination with transmission mechanism for effecting relative movement between said supports, of manually operable means therefor, a connector normally positioned for coupling said manually operable means to said mechanism, a power operable means, a control circuit energizable to cause operation of said power operable means, means responsive to the energization of said circuit for shifting said connector to disconnect said manually operable means and connect said power operable means to said mechanism, means in said circuit for delaying return of said connector to its normal position upon deenergization of said circuit, and means effective at will to render said delay means inoperative to cause immediate return of said connector to its normal position.

11. In a grinding machine having a work support and a grinding wheel support, the combination of transmission mechanism for effecting relative movement between said supports, a power operable device for actuating said mechanism, a power control circuit therefor including a first control adapted to be manually held to maintain energization of said power operable means to cause advance of one support toward the other, a second control in said circuit and manually operable to cause retraction of the grinding wheel support, latching means responsive to operation of said second control for maintaining energization of said circuit, and a third control for rendering said latching means ineffective and thereby stoppage of the said power operable means.

12. In a grinding machine having a work support and a grinding wheel support, the combination of transmission mechanism for effecting relative movement between said supports, a power operable device for actuating said mechanism, a power control circuit therefor including a first control adapted to be manually held to maintain energization of said power operable means to cause advance of one support toward the other, a second control in said circuit and manually operable to cause retraction of the grinding wheel support, latching means responsive to operation of said second control for maintaining energization of said circuit, a third control for rendering said latching means ineffective and thereby stoppage of the said power operable means, and limit switches effective when the moving support reaches either of its extreme positions for deenergizing said circuit.

13. In a grinding machine having a work support, a traveling carriage and a grinding wheel rotatably mounted on the carriage, the combination of a power operable transmission for traversing said carriage including a direct current motor, a control circuit therefor including a first switching means for coupling the motor for operation at its lowest basic speed, a second switching means for coupling said motor for operation at a grinding speed, a pair of limit switches, means carried by the traveling carriage and responsive to movement thereof to cause sequential operation of said switches, means responsive to operation of the first limit switch to render said second-named switching means ineffective, and said first-named switching means effective, and means responsive to operation of the second limit switch to render said first-named switching means ineffective.

14. In a grinding machine having a work support, a traveling carriage and a grinding wheel rotatably mounted on the carriage, the combination with power operable means for reciprocating said carriage, of a trip control mechanism including a trip element supported and connected for a modified rate of movement by said carriage, oscillatable dog rails supported on opposite sides of said trip element, adjustable dogs mounted on said rails for actuation of said trip elements, and switch control means operable in sequence by dog oscillation of either of said rails for slowing down and subsequently stopping said power operable means.

15. In a grinding machine having a work support, a traveling carriage and a grinding wheel rotatably mounted on the carriage, the combination with power operable means for reciprocating said carriage, of a trip control mechanism including a trip element supported and connected for a modified rate of movement by said carriage, oscillatable dog rails supported on opposite sides of said trip element, adjustable dogs mounted on said rails for actuation of said trip elements, switch control means operable in sequence by dog oscillation of either of said rails for slowing down and subsequently stopping said power operable means, said switch control means including a first switch for effecting deceleration of said power operable means, and a second switch for stopping said power operable means and setting a timer into operation, and means responsive to the timer for initiating operation of said power operable means in a reverse direction.

16. In a grinding machine having a work support, a traveling carriage and a grinding wheel rotatably mounted on the carriage, the combination with power operable means for reciprocating said carriage, of a trip control mechanism including a trip element supported and connected for a modified rate of movement by said carriage, oscillatable dog rails supported on opposite sides of said trip element, adjustable dogs mounted on said rails for actuation of said trip elements, switch control means operable in sequence by dog oscillation of either of said rails for slowing down and subsequently stopping said power operable means, said switch control means including a first switch for effecting deceleration of said power operable means, and a second switch for stopping said power operable means and setting a timer into operation, means responsive to the timer for initiating operation of said power operable means in a reverse direction, and a third switch operable at will to stop said power operable means.

17. In a grinding machine having a work support, a traveling carriage and a grinding wheel rotatably mounted on the carriage, the combination with power operable means for reciprocating said carriage, of a trip control mechanism including a trip element supported and connected for a modified rate of movement by said carriage, oscillatable dog rails supported on opposite sides of said trip element, adjustable dogs mounted on said rails for actuation of said trip elements, switch control means operable in sequence by dog oscillation of either of said rails for slowing down and subsequently stopping said power operable means, said switch control means including a first switch for effecting deceleration of said power operable means, and a second switch for stopping said power operable means and setting a timer into operation, means responsive to the timer for initiating operation of said said power operable means in a reverse direction, and a pilot light operable by said second switch.

18. In a grinding machine having a bed, a headstock and a tailstock mounted on said bed, work supporting spindles journaled in each of said stocks having work supporting centers and work driving chucks associated therewith, power operable means for retracting one of said stocks relative to the other for insertion of work and for advancing the stock into work supporting position, means to clamp the stocks to the bed, hydraulically operable means for applying pressure to one of said spindles to insure a tight holding pressure on the work including a throttle valve mounted on one of said stocks and a pressure gage for indicating the applied pressure.

WALTER A. HOIER.
EDILIO J. RIVOIRA.
LINCOLN E. MEHLHOPE.

REFERENCES CITED

The following references are of record in the file of this patent:

UNITED STATES PATENTS

| Number | Name | Date |
|---|---|---|
| 1,168,858 | Coleman | Jan. 18, 1916 |
| 1,453,572 | Stoner | May 1, 1923 |
| 1,658,539 | Stoner | Feb. 7, 1928 |
| 1,816,750 | Steiner et al. | July 28, 1931 |
| 1,932,993 | Tegarden | Oct. 31, 1933 |
| 1,952,423 | Dall et al. | Mar. 27, 1934 |
| 2,012,065 | Haas et al. | Aug. 20, 1935 |
| 2,129,049 | Doran | Sept. 6, 1938 |
| 2,142,050 | Garside | Dec. 27, 1938 |
| 2,164,875 | Herfurth | July 4, 1939 |
| 2,170,494 | Ernst et al. | Aug. 22, 1939 |
| 2,211,530 | Balsiger et al. | Aug. 13, 1940 |
| 2,376,236 | Decker et al. | May 15, 1945 |
| 2,404,613 | Belden et al. | July 23, 1946 |